(12) United States Patent
Sorenson, III

(10) Patent No.: US 10,210,167 B1
(45) Date of Patent: Feb. 19, 2019

(54) MULTI-LEVEL PAGE CACHING FOR DISTRIBUTED OBJECT STORE

(75) Inventor: James C. Sorenson, III, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 1131 days.

(21) Appl. No.: 13/465,961

(22) Filed: May 7, 2012

(51) Int. Cl.
*G06F 12/00* (2006.01)
*G06F 17/30* (2006.01)

(52) U.S. Cl.
CPC .......................... *G06F 17/30132* (2013.01)

(58) Field of Classification Search
CPC ......... G06F 17/30132; G06F 17/30902; G06F 17/0866
See application file for complete search history.

(56) References Cited

U.S. PATENT DOCUMENTS

| | | | |
|---|---|---|---|
| 7,979,641 B2 * | 7/2011 | He et al. ....................... | 711/129 |
| 8,006,061 B1 * | 8/2011 | Chatterjee et al. ........... | 711/170 |
| 2010/0169302 A1 * | 7/2010 | Lopes ................. | G06F 12/0804 |
| | | | 707/713 |
| 2010/0281230 A1 * | 11/2010 | Rabii et al. ................... | 711/165 |
| 2011/0072206 A1 * | 3/2011 | Ross ..................... | G06F 17/302 |
| | | | 711/108 |
| 2012/0072652 A1 * | 3/2012 | Celis ..................... | G06F 12/121 |
| | | | 711/103 |

OTHER PUBLICATIONS

Canim, M. et al., "SSD Bufferpool Extensions for Database Systems," Proc. of the VLDB Endowment, vol. 3., No. 2, 2010, pp. 1435-1446.

* cited by examiner

*Primary Examiner* — David Yi
*Assistant Examiner* — Tahilba O Puche
(74) *Attorney, Agent, or Firm* — Seed IP Law Group LLP

(57) ABSTRACT

Techniques are described for managing access to data storage in a plurality of bitstore nodes. In some situations, a data storage service uses multiple bitstore nodes to store data accessible via a network, such as the Internet. In some situations, multi-level cache systems are employed by each bitstore node and managed, for example to increase throughput of the data storage service.

19 Claims, 14 Drawing Sheets

MULTI-LEVEL PAGE CACHING FOR DISTRIBUTED OBJECT STORE

BACKGROUND

Many different computing applications rely on some type of storage medium for the persistent storage of various kinds of application data. For example, common office applications and multimedia applications generate and use application data of various types and formats, such as documents, spreadsheets, still images, audio and video data, among others. Frequently, such data is stored for repeated access or use on behalf of a user. For example, a user may wish to store and work with a number of documents or other data over a period of time, and may expect that the data will be readily available in a predictable state when needed.

In conventional computing systems, the storage medium used by applications for persistent application data storage is most commonly a magnetic fixed drive or "hard drive," although optical and solid-state storage devices are also used. Such devices are either integrated within a computer system that executes the applications or accessible to that system via a local peripheral interface or a network. Typically, devices that serve as application storage are managed by an operating system that manages device-level behavior to present a consistent storage interface, such as a file system interface, to various applications needing storage access.

This conventional model of application storage presents several limitations. First, it generally limits the accessibility of application data. For example, if application data is stored on the local hard drive of a particular computer system, it may be inaccessible to applications executing on other systems. Even if the data is stored on a network-accessible device, applications that execute on systems outside the immediate network may not be able to access that device. For example, for security reasons, enterprises commonly restrict access to their local area networks (LANs) such that systems external to the enterprise cannot access systems or resources within the enterprise. Thus, applications that execute on portable devices (e.g., notebook or handheld computers, personal digital assistants, mobile telephony devices, etc.) may experience difficulty accessing data that is persistently associated with fixed systems or networks.

The conventional application storage model also may fail to adequately ensure the reliability of stored data. For example, conventional operating systems typically store one copy of application data on one storage device by default, requiring a user or application to generate and manage its own copies of application data if data redundancy is desired. While individual storage devices or third-party software may provide some degree of redundancy, these features may not be consistently available to applications, as the storage resources available to applications may vary widely across application installations. The operating-system-mediated conventional storage model may also limit the cross-platform accessibility of data. For example, different operating systems may store data for the same application in different, incompatible formats, which may make it difficult for users of applications executing on one platform (e.g., operating system and underlying computer system hardware) to access data stored by applications executing on different platforms.

Some servers include a number of hard disk drives (for example, eight or more hard disk drives) to provide adequate data storage. Typically, the hard disk drives for servers are of a standard, off-the-shelf type. Standard, off-the-shelf hard disk drives are often a cost effective solution for storage needs because such hard disk drives can be obtained at relatively low cost. Nonetheless, in server designs using such standard hard disk drives, the arrangement of the hard disk drives may leave a substantial amount of wasted space in the server chassis. This wasted space, especially when multiplied over many servers in a rack, may result in inadequate computing or storage capacity for a system.

Hard disk drives include motors and electronic components that generate heat. Some or all of this heat must be removed from the hard disk drives to maintain continuous operation of a server. As with other components, hard disk drives fail from time to time while in service. These failures reduce the storage capacity of a system. To restore capacity, servers may need to be powered down and removed from a rack so that the defective hard disk drives can be replaced or repaired.

In some systems, such as archival, backup, or disaster recovery systems, a vast amount of data may need to be stored, though any particular piece of the stored data may be accessed only rarely. Magnetic tape systems are often used to store archival data. Magnetic tape drives, however, may be fragile and susceptible to adverse environmental conditions, such as heat and humidity. In addition, some magnetic tape drives have relatively high failure rates.

DETAILED DESCRIPTION

Figure 1:
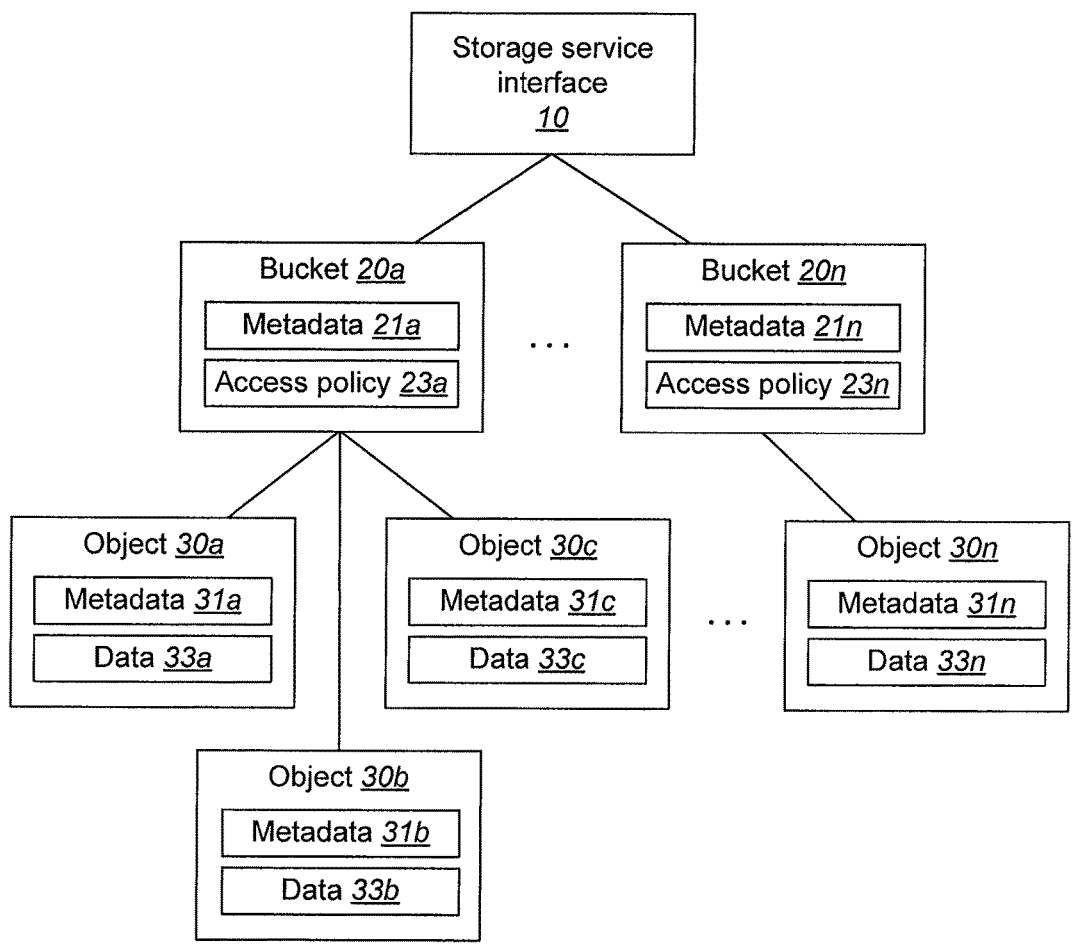
FIG. 1 is a block diagram illustrating one embodiment of a storage model for presenting storage to users as a web service.

As computing applications become more data intensive as well as geographically dispersed, the need for reliable, location-independent access to application data increases. For example, multimedia applications, such as authoring, storage and playback applications, require escalating amounts of data storage as the quality and quantity of multimedia content improves. Further, it may be desirable to access application data from a variety of locations irrespective of the location of the device storing the data. For example, while many computers include substantial amounts of disk-based storage, accessing such storage remotely in a uniform and convenient manner presents technical and security difficulties.

In contrast to configuring individual computers to rely solely on their own internal storage resources or provisioning local network-based storage resources (e.g., Network Attached Storage (NAS), Storage Area Network (SAN), etc.), an Internet-connected data storage service may be configured to provide generic storage services to clients via Internet-based protocols, such as web services (WS) protocols, for example. Internet-based protocols such as web services protocols are typically platform-independent, in that they typically function independently of underlying software or hardware. Consequently, providing data storage capabilities as web services may afford many different types of applications straightforward access to arbitrary amounts of storage independent of the storage resources implemented within the applications' host systems or on local networks. Additionally, web service-accessible storage may generally be accessible from any location that provides Internet access. Web service-accessible storage may facilitate implementation of a number of different computing features, such as remote access to common data by different devices or applications, remote access to widely distributed data by individual applications during execution, access to and/or sharing of data among distributed users working in collaboration, dissemination of application result data among distributed users, and many other similar features.

Techniques are described for managing web service-accessible storage. In at least some embodiments, the techniques include managing a multilevel cache having a random access memory (RAM) and a solid-state memory drive based at least in part on one or more multi-level cache management policies, such as RAM flushing policies, RAM eviction policies, SSD flushing policies, and SSD eviction policies, as discussed in more detail below. One or more parameters (e.g., RAM flushing parameters, RAM eviction parameters, SSD flushing parameters, SSD eviction parameters, etc.) may be employed as part of implementing the policies. In at least some embodiments, the techniques include providing web service-accessible storage that uses multiple bitstore nodes. In at least some embodiments, erasure coding may be employed to provide redundancy to enhance data reliability and availability. In other embodiments other types of data replication and redundancy techniques may be used, whether in addition to or instead of erasure coding techniques. The bitstore nodes may in some embodiments be organized into one or more pools or other groups that each have multiple physical bitstore nodes co-located at a geographical location, such as in each of one or more geographically distributed data centers. In at least some embodiments, the bitstore nodes each employ a multi-level cache and manage creation, retrieval, retention, eviction and flushing of data from the multi-level cache. In at least some embodiments, the bitstore nodes may exchange information related to data storage and usage, such as the identification of data pages or objects with a high level of use or an expected high level of use, so as to facilitate management of data in the multi-level caches of the bitstore nodes. For example, mechanisms may be employed to prevent or delay eviction of pages identified by a first bitstore node from one or more levels of a multi-level cache of the first bitstore node and/or of another bitstore node, such as another bitstore node in a set of bitstore nodes. In some embodiments, pre-fetching of identified pages (such as pages from identified objects) may be employed, while pre-fetching may not be employed in other embodiments.

In the following discussion, an embodiment of a possible data storage model that may be used in a web services-based storage system is described. Subsequently, a storage service system that may be configured to provide storage services according to the data storage model is disclosed, and its various components are described.

One embodiment of a storage model for providing data storage to users as a service, such as a web service, is illustrated in FIG. 1. In the illustrated model, storage service interface 10 is provided as a customer- or user-facing interface to the storage service. According to the model presented to a user by interface 10, the storage service may be organized as an arbitrary number of buckets 20a-n accessible via interface 10. Each bucket 20 may be configured to store an arbitrary number of objects 30a-n, which in turn may store data specified by a user of the storage service.

As described in greater detail below, in some embodiments storage service interface 10 may be configured to support interaction between the storage service and its users according to a web services model. For example, in one embodiment, interface 10 may be accessible by clients as a web services endpoint having a Uniform Resource Locator (URL), e.g., http://storageservice.domain.com, to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

Web services may be implemented in a variety of architectural styles, using a variety of enabling service protocols. For example, in a Representational State Transfer (REST)-style web services architecture, the parameters that are pertinent to a web services call (e.g., specifying the type of service requested, user credentials, user data to be operated on, etc.) may be specified as parameters to the data transport command that invokes the web services call to the web services endpoint, such as an HTTP GET or PUT command. In some implementations, REST-style web services architectures are stateless, in that each web services call may contain all the information necessary to process that call without reference to external state information. In contrast to REST-style web services architectures, document-based or message-based web services architectures may encode the parameters and data pertinent to a web services call as a document that may be transmitted to a web services endpoint and then decoded and acted upon by the endpoint. For example, a version of eXtensible Markup Language (XML) or another suitable markup language may be used to format the web services request document. In some embodiments, the markup language used to format the request document may delimit parameters that control the processing of the request, while in other embodiments certain features of the markup language itself (e.g., certain tags) may directly control aspects of request processing. Additionally, in some embodiments, the resulting document may be encapsulated within another protocol, such as a version of the Simple Object Access Protocol (SOAP), for example, in order to facilitate processing of the web services request by the endpoint.

Other protocols may also be employed within various embodiments of web services architectures. For example, a version of Web Services Description Language (WSDL) may be employed by a web services endpoint to publish its interfacing requirements to potential clients. Web services endpoints may make themselves known to potential clients through a directory protocol such as a version of the Universal Description, Discovery and Integration (UDDI) protocol. Numerous other types of protocols relating to the provision of computing services via web services interfaces may exist, and any given web services implementation may use any suitable combination of such protocols.

It is contemplated that in some embodiments, interface 10 may support interfaces other than web services interfaces, instead of or in addition to a web services interface. For example, an enterprise may implement a storage service for use by clients external to the enterprise, who may access the service via web services protocols, as well as users within the enterprise, who may use a different type of interface (e.g., a proprietary interface customized to the enterprise's intranet). In some embodiments, interface 10 may support each of the various types of interfacing protocols through which any user of the storage service may access the service. In other embodiments, different instances of interface 10 may be provided for each distinct interface approach. It is noted that in some embodiments, those aspects of interface 10 related to handling interactions with clients (e.g., receiving and responding to service requests) may be implemented separately from those aspects that implement the general architecture of the storage service (e.g., the organization of the service into a hierarchy of buckets and objects). In some such embodiments, the portion of interface 10 relating to client interaction (e.g., via web services protocols) may be bypassed by certain users, such as those internal to an enterprise.

As shown in FIG. 1, interface 10 provides storage service users with access to buckets 20. Generally speaking, a bucket 20 may function as the root of an object namespace that is associated with a user of the storage service. For example, a bucket 20 may be analogous to a file system directory or folder. In some embodiments, individual buckets 20 may also form the basis for accounting for usage of the storage service. For example, a user may be associated with one or more buckets 20 for billing purposes, and that user may be billed for usage of storage resources (e.g., storage of objects 30) that hierarchically reside within the namespace established by those buckets 20.

In the illustrated embodiment, each of buckets 20*a-n* includes associated metadata 21*a-n* as well as a respective access policy 23*a-n*. Generally speaking, metadata 21 may include any suitable metadata that may be used to describe aspects or properties of a given bucket 20. For example, metadata 21 may include information identifying the date of a bucket's creation, the identity of its creator, whether the bucket has any objects 30 associated with it, or other suitable information. In some embodiments, metadata 21 may include information indicative of usage characteristics of a bucket 20, such as the total size of objects 30 associated with bucket 20, access history of users with respect to bucket 20 and/or its associated objects 30, billing history associated with bucket 20, or any other suitable information related to current or historical usage of bucket 20. In one embodiment, each bucket 20 may be associated with a respective unique identifier, which may be specified by a user or automatically assigned by the storage service. The unique identifier may be stored within metadata 21 or as a separate property or field of bucket 20. It is noted that in some embodiments, a given bucket 20 may not include explicit references, pointers or other information corresponding to the objects 30 associated with given bucket 20. Rather, as described in greater detail below, location and selection of objects 30 may be performed through the use of a separate mapping facility referred to herein as a keymap.

An access policy 23 may include any information needed to control access to objects 30 associated with a bucket 20. Access policy 23 may include information identifying the client or clients allowed to access a bucket 20 and its associated objects 30, and in what capacity. For example, access policy 23 may store a user identifier and/or authentication credentials (e.g., a password) for one or more clients, and may further specify whether a given client is allowed to modify or only read objects 30. Access policy 23 may also implement default or group-oriented policies (e.g., by allowing universal read access but limiting write access to objects 30 to a specified client or group of clients) or any other desired security model.

In the illustrated embodiment, a given bucket 20 may be associated with one or more objects 30, each of which may include respective metadata 31 and data 33. Generally speaking, data 33 of an object 30 may correspond to any sequence of bits. The type of data represented by the bits stored within an object 30 may be transparent to the storage service. That is, the bits may represent text data, executable program code, audio, video or image data, or any other type of digital data, and the storage service may not necessarily distinguish among these various data types in storing and manipulating objects 30. In some embodiments, the size of data 33 may be limited to a fixed ceiling (e.g., 1 gigabyte (GB)), while in other embodiments, objects 30 may be allowed to scale in size subject only to the physical storage resources available to the storage service.

Similar to metadata 21 associated with buckets 21, metadata 31 may be configured to store any desired descriptive information about its corresponding object 30. For example, metadata 31 may include information about the date and/or time the corresponding object 30 was created, the size of object 30, the type of data 33 stored by object 30 (e.g., a data type defined by the Multipurpose Internet Mail Extensions (MIME) standard), or any other type of descriptive information. In some embodiments, metadata 31 may store usage or history information indicative of user interactions with corresponding object 30, as well as access policy information (e.g., permission information indicating the types of access various users may have to the object 30), object cost information (e.g., billing rate or history associated with the object 30), or any other suitable information or combination of types of information attributable to object 30. In some instances, a client may provide metadata along with object data to be stored as metadata 31, while in other cases, metadata 31 may include metadata generated by the system that manages storage service features (e.g., the storage service system illustrated in FIG. 2 and described below). Some, all or none of metadata 31 may be accessible to a client having access rights to an object 30, depending on the type of metadata, specific provisions of the client's access rights, or other suitable factors.

In one embodiment, individual objects 30 may be identified within the storage service system using either of two distinct items of information: a key or a locator. Generally speaking, keys and locators may each include alphanumeric strings or other types of symbols that may be interpreted within the context of the namespace of the storage service system as a whole, although keys and locators may be interpreted in different ways. In one embodiment, a key may be specified by a client at the time a corresponding object 30 is created within a particular bucket 20 (e.g., in response to a request by the client to store a new object). If no key is specified by the user, a key may be assigned to the new object 30 by the storage service system. In such an embodiment, each respective key associated with objects 30 of a particular bucket 20 may be required to be unique within the namespace of that bucket 20. Generally speaking, a key may persist as a valid identifier through which a client may access a corresponding object 30 as long as the corresponding object exists within the storage service system.

Within a given bucket 20, keys may be used to generate a hierarchical object namespace similar to a file directory or folder namespace common to the file systems of conventional operating systems.

It is noted that in some embodiments, hierarchical structure that is implied by a key may not necessarily be reflected in the underlying hierarchy of object storage. For example, in one embodiment, objects 30 associated with a given bucket 20 may be stored in a flat, non-hierarchical fashion within the storage service system, even though the keys associated with the objects 30 may imply a hierarchy. That is, in such an embodiment, buckets 20 may not hierarchically include other buckets 20. However, in other embodiments, hierarchical inclusion of buckets 20 within other buckets 20 may be supported, although any such hierarchy of buckets need not map directly to a hierarchy implied by object keys.

In one embodiment, a request by a client to access an object 30 identified by a key may be subjected to client authentication procedures, access control checks, and/or a mapping process before the underlying data 33 of the requested object 30 is retrieved or modified.

By contrast, the storage service system may support an alternative method of accessing objects 30 by locators rather than keys. Generally speaking, a locator may represent a globally unique identifier of an object 30 among all objects 30 known to the storage service system. That is, while a key may be unique to a namespace associated with a particular bucket 20, a locator may be unique within a global namespace of all objects 30 within all buckets 20. For example, a locator may include an alphanumeric string generated by the storage service system to be unique among other locators. As described in greater detail below, in some embodiments, multiple instances of an object 30 may be replicated throughout the physical storage devices used to implement the storage service system, for example to increase data redundancy and fault tolerance. In such embodiments, a unique locator may exist for each replicated instance of a given object 30.

Figure 2:
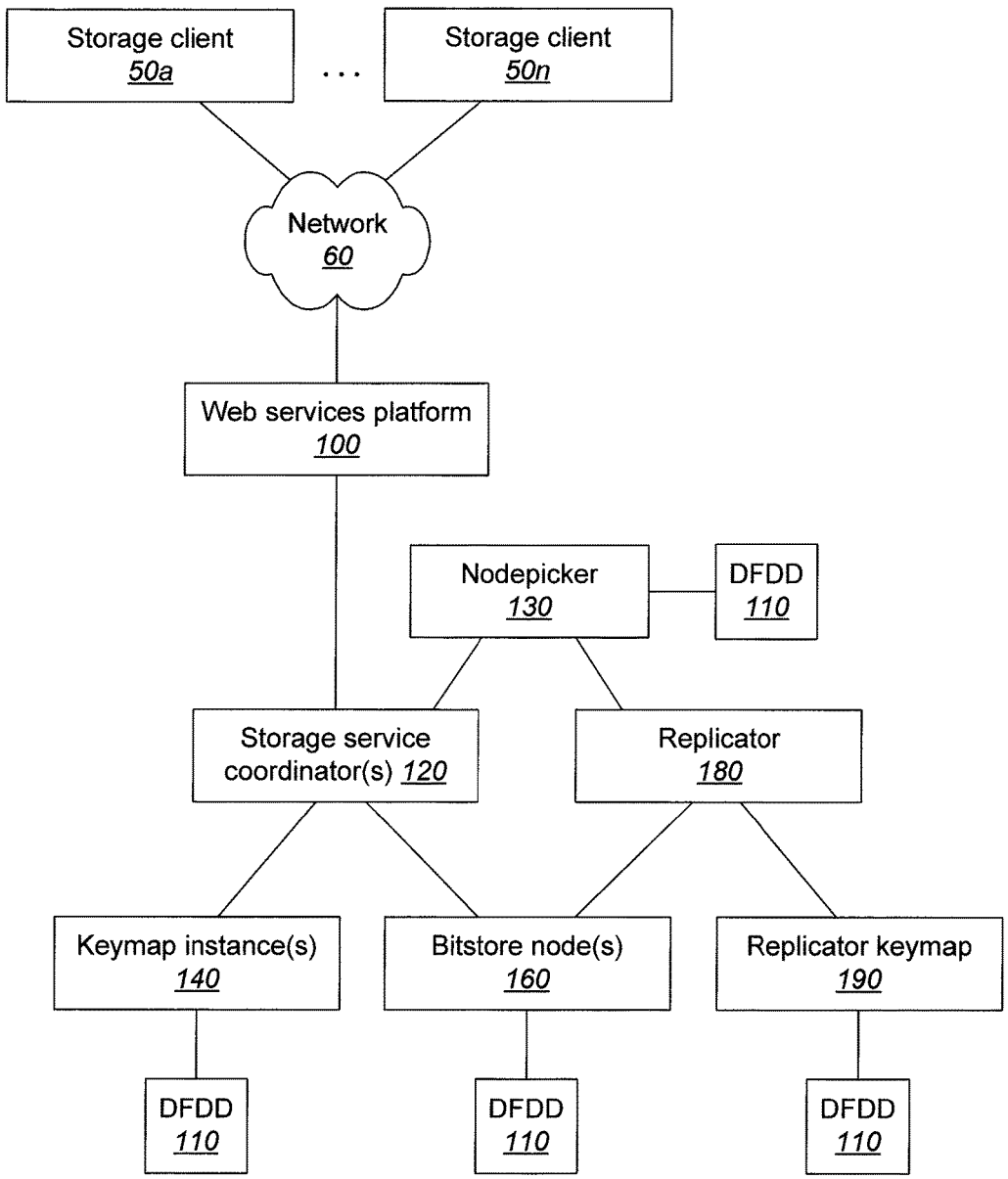
FIG. 2 is a block diagram illustrating one embodiment of a storage service system architecture.

One embodiment of a storage service system architecture that may be configured to implement a web services-based storage service such as that illustrated in FIG. 1 is shown in FIG. 2. In the illustrated embodiment, a number of storage clients 50a-n may be configured to interact with a web services platform 100 via a network 60. Web services platform 100 may be configured to interface with one or more instances of a storage service coordinator 120 (or simply, coordinator(s) 120), which in turn may interface with one or more keymap instances 140 and bitstore nodes 160. Additionally, a replicator 180 may also be configured to interface with bitstore nodes 160 as well as a replicator keymap instance 190. Both coordinator(s) 120 and replicator 180 may interface with a nodepicker service 130. In the illustrated embodiment, each instance of nodepicker 130, keymap 140, bitstore nodes 160 and the replicator keymap 190 may be associated with a respective instance of a discovery and failure detection daemon (DFDD) 110. It is noted that where one or more instances of a given component may exist, reference to that component hereinbelow may be made in either the singular or the plural. However, usage of either form is not intended to preclude the other.

Figure 3:
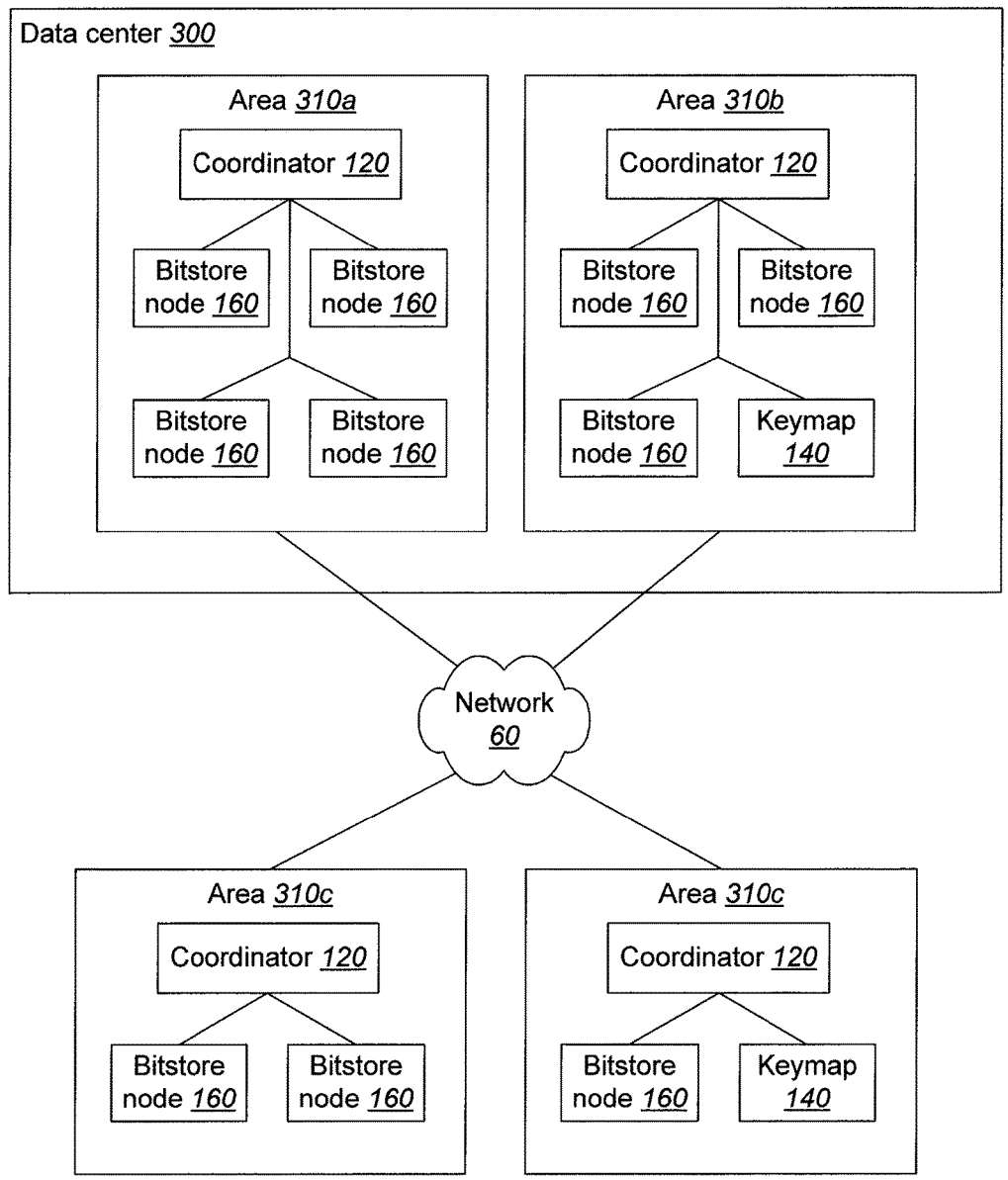
FIG. 3 is a block diagram illustrating one embodiment of a physical deployment of storage service system components.

In various embodiments, the components illustrated in FIG. 2 may be implemented directly within computer hardware, as instructions directly or indirectly executable by computer hardware (e.g., a microprocessor or computer system), or a combination of these techniques. For example, the components of FIG. 2 may be implemented by a distributed system including a number of computing nodes (or simply, nodes). In various embodiments, the functionality of a given storage service system component may be implemented by a particular node or distributed across several nodes. In some embodiments, a given node may implement the functionality of more than one storage service system component. Following is an overview of the general functionality of the components of FIG. 2, and an exemplary physical deployment of the storage service system is shown in FIG. 3.

Generally speaking, storage clients 50 may encompass any type of client configurable to submit web services requests to web services platform 100 via network 60. For example, a given storage client 50 may include a suitable version of a web browser, or a plugin module or other type of code module configured to execute as an extension to or within an execution environment provided by a web browser. Alternatively, a storage client 50 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage client 50 may be an application configured to interact directly with web services platform 100. Storage client 50 may be configured to generate web services requests according to a Representational State Transfer (REST)-style web services architecture, a document- or message-based web services architecture, or another suitable web services architecture.

In other embodiments, storage client 50 may be configured to provide access to web services-based storage to other applications in a manner that is transparent to those applications. For example, storage client 50 may be configured to integrate with an operating system or file system to provide storage in accordance with a suitable variant of the storage model described above. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to web services platform 100 may be coordinated by storage client 50 and the operating system or file system on behalf of applications executing within the operating system environment.

Storage clients 50 may convey web services requests to and receive responses from web services platform 100 via network 60. In various embodiments, network 60 may encompass any suitable combination of networking hardware and protocols necessary to establish web-based communications between clients 50 and platform 100. For example, network 60 may generally encompass the various telecommunications networks and service providers that collectively implement the Internet. Network 60 may also include private networks such as local area networks (LANs) or wide area networks (WANs) as well as public or private wireless networks. For example, both a given client 50 and web services platform 100 may be respectively provisioned within enterprises having their own internal networks. In such an embodiment, network 60 may include the hardware (e.g., modems, routers, switches, load balancers, proxy servers, etc.) and software (e.g., protocol stacks, accounting software, firewall/security software, etc.) necessary to establish a networking link between given client 50 and the Internet as well as between the Internet and web services platform 100. It is noted that in some embodiments, storage clients 50 may communicate with web services platform 100 using a private network rather than the public Internet.

Generally speaking, web services platform 100 may be configured to implement one or more service endpoints configured to receive and process web services requests, such as requests to access objects 30 stored by a storage service system. For example, web services platform 100 may include hardware and/or software configured to implement an endpoint http://storageservice.domain.com such that an HTTP-based web services request directed to that endpoint is properly received and processed. In one embodiment, web services platform 100 may be implemented as a server system configured to receive web services requests from clients 50 and to forward them to coordinator(s) 120 or to other components of the storage service system for processing. In other embodiments, web services platform 100 may be configured as a number of distinct systems (e.g., in a cluster topology) implementing load balancing and other request management features configured to dynamically manage large-scale web services request processing loads.

In various embodiments, web services platform 100 may be configured to support REST-style or document-based (e.g., SOAP-based) types of web services requests. In one particular embodiment, platform 100 may be configured to implement a particular web services application programming interface (API) that supports a variety of operations on entities managed by the storage service system. For example, the API implemented by platform 100 may support basic client operations on buckets or objects, including listing of buckets 20 or objects 30 (optionally filtered according to a filter pattern or criterion), retrieval of data or metadata of buckets 20 or objects 30, and creation or deletion of buckets 20 or objects 30. In some embodiments, the API may support more sophisticated client operations such as batch application of operations to multiple buckets 20 or objects 30.

In addition to functioning as an addressable endpoint for clients' web services requests, in some embodiments web services platform 100 may implement various client management features. For example, platform 100 may coordinate the metering and accounting of client usage of web services, including storage resources, such as by tracking the identities of requesting clients 50, the number and/or frequency of client requests, the size of objects 30 stored or retrieved on behalf of clients 50, overall storage bandwidth used by clients 50, class of storage requested by clients 50, or any other measurable client usage parameter. Platform 100 may also implement financial accounting and billing systems, or may maintain a database of usage data that may be queried and processed by external systems for reporting and billing of client usage activity.

In certain embodiments, platform 100 may be configured to collect and/or monitor a variety of storage service system operational metrics, such as metrics reflecting the rates and types of requests received from clients 50, bandwidth utilized by such requests, system processing latency for such requests, system component utilization (e.g., network bandwidth and/or storage utilization within the storage service system), rates and types of errors resulting from requests, characteristics of requested objects 30 (e.g., size, data type, etc.), or any other suitable metrics. In such embodiments, platform 100 may be configured to collect such metrics in the aggregate, for example as averages over time, or as specific data points that may be subjected to a variety of analyses. In various embodiments, such metrics may be employed to test or monitor system performance in ways that may or may not be visible to clients 50. For example, in one embodiment such metrics may be used by system administrators to tune and maintain system components, while in other embodiments such metrics (or relevant portions of such metrics) may be exposed to clients 50 to enable such clients to monitor their usage of the storage service system.

While in some embodiments, a storage service system such as the system of FIG. 2 may support objects 30 of arbitrary sizes, in other embodiments objects 30 may be constrained to a certain maximum size, also referred to as a chunk size. In some such embodiments, when a client provides data to be stored in association with a key and the data exceeds the chunk size, platform 100 may be configured to divide the data into two or more chunks according to the chunk size. In one embodiment, platform 100 may be configured to generate each chunk as a respective object 30 having an associated key value. Platform 100 may generate the key values for each chunk as a function of the client-supplied key in such a way that the original client data can be reconstructed from the chunks when a request for access referencing the client-supplied key is performed. For example, platform 100 may be configured to generate N chunks from client data, and may generate N corresponding keys for these chunks by appending N distinct patterns to the client-supplied key, where the N distinct patterns are lexicographically ordered in the same order in which the N chunks were generated. Each of the N chunks may then be managed as a distinct object 30 using the techniques described herein, and the original data may be regenerated by listing all of the objects 30 having key values for which the client-supplied key is a prefix and retrieving those objects in the listed order. In some embodiments, individual chunks may be accessed, modified or removed without disturbing other chunks, which may improve system performance relative to managing data as a single, large object 30. It is contemplated that in some embodiments, a client 50 may be permitted to specify whether a data object it provides should be split into chunks or not.

As is the case with many of the storage service system components shown in FIG. 2, segregating the functionality of web services platform 100 from other components may improve maintenance and overall scalability of the storage service system. For example, additional hardware and software resources may be specifically provisioned for managing additional web services processing load independently of resources allocated to other tasks. Further, the effects of any resource failures associated with platform 100 may be confined to that particular functional area, thus facilitating the isolation and resolution of failures. However, in some embodiments, it is contemplated that the functionality of platform 106 may be integrated into other components. For example, coordinator(s) 120 may be configured to include the tasks associated with platform 100.

It is also noted that while web services platform 100 may represent the primary interface through which clients 50 may access the features of the storage service system, it need not represent the sole interface to such features. For example, in some embodiments coordinator(s) 120 may be configured to support an alternate API that may be distinct from a web services interface. Such an alternate API may be used, for example, to allow clients internal to the enterprise providing the storage service system to bypass web services platform 100.

Coordinators 120 may be configured to coordinate activity between web services platform 100 and other components of the storage service system. In one embodiment, the primary responsibilities of coordinators 120 may include conducting read and write activity of object data 33 and metadata 31 for objects 30 in response to web services requests directed to those objects 30. For example, object read access may involve performing an access to a keymap instance 140 to retrieve locators that indicate the bitstore nodes 160 where replicas of a given object 30 are stored, followed by performing an access to a particular bitstore node 160 in order to read the requested data. Similarly, object creation or modification may involve storing a number of replicas of objects 30 to various bitstore nodes 160 and updating keymap instance 140, if necessary, to reflect the locators of the created or modified replicas. In some embodiments, coordinators 120 may be configured to perform these read and write operations to keymap instances 140 and bitstore nodes 160. However, it is noted that in certain embodiments, coordinators 120 may not operate to create the full number of desired replicas of an object 30 at the time of its creation or modification. In some embodiments a write operation to an object 30 may be considered complete when coordinators 120 have completed writing a certain number of replicas of that object 30 (e.g., two replicas). Further replication of that object 30 may be completed as an out-of-band or asynchronous operation by replicator 180. That is, in such embodiments, the in-band or synchronous portion of the object creation or modification operation may include the generation of fewer than the total desired number of replicas of the affected object 30. It is noted that while coordinator 120 is illustrated as a distinct component from keymap instances 140, bitstore nodes 160, and other system components, it is possible in some embodiments for an instance of coordinator 120 to be implemented together with another system component (e.g., as software components executable by a single computer system). Thus, although the description herein may refer to coordinator 120 storing or retrieving data to or from a bitstore node 160, a keymap instance 140, or another component, it is understood that in some embodiments such processing may occur within shared computing system resources.

As described above with respect to FIG. 1, in some embodiments the storage service system may include a bucket-based storage model in which keys for various objects 30 may be grouped into buckets 20 for administrative (e.g., accounting, billing), security or other purposes. In one embodiment, coordinators 120 may be configured to process various bucket-related operations in response to corresponding web services requests from clients 50. For example, coordinators 120 may be configured to perform some or all of the following bucket operations: Create bucket: Generate and store a new bucket name for a bucket 20. Delete nonempty bucket: Delete a given bucket 20 including associated metadata 21 and all keys associated with objects 30 within given bucket 20. Delete empty bucket: Delete given bucket 20 and associated metadata 21 only if no keys of objects 30 are associated with given bucket 20, otherwise return an error condition. Write bucket data: Write data (e.g., metadata 21) to an existing bucket 20. List bucket keys: List keys of objects 30 associated with a given bucket 20 (optionally sorted or filtered according to a pattern, regular expression, wildcards, etc.). List buckets: List buckets 20 associated with a given subscriber (e.g., a user or client 50). In some embodiments, coordinators 120 may be configured to generate identifiers for newly created buckets 20 using a suitable random number algorithm with a low probability of generating collisions. In other embodiments, coordinators 120 may be configured to support client-specified bucket identifiers, for example by checking requested identifiers for uniqueness with respect to existing bucket identifiers upon a client request for bucket creation.

As mentioned above, instances of objects 30 may be replicated across different bitstore nodes 160, for example to increase the likelihood that object data will survive the failure of any given node 160 or its related infrastructure. Object replication within the storage service system presents several opportunities for management and optimization that may be addressed in the illustrated embodiment by nodepicker 130 and replicator 180, as follows.

When coordinator 120 receives a request to write an object 30, it may correspondingly write object 30 to a given number of nodes 160 before declaring the write to be complete. However, the number and particular selection of nodes 160 to which object 30 should be written may vary depending on a number of different storage policy considerations. For example, requiring that a certain minimum number of replicas (e.g., two or three) of object 30 have been successfully written before the write operation is considered to be completed may be prudent in order for the written data to be durable in view of possible failures. However, it may also be desirable to ensure that the nodes 160 chosen to store the minimum number of replicas are distributed among different possible loci of failure, or areas. For example, nodes 160 that are located in the same data center may be more likely to fail concurrently (e.g., due to a catastrophic failure such as a natural disaster, power failure, etc.) than nodes 160 that are geographically separated.

Nodepicker 130, which may be referred to generically as storage node selection logic, may be configured as a service accessible by coordinator 120 and replicator 180 that, in one embodiment, may implement algorithms for selecting nodes 160 for object read and write operations such that various storage policies are satisfied. For example, in the case of writing an object 30 as outlined above, nodepicker 130 may operate to develop a write plan, or a particular sequence of nodes 160 to which the object 30 should be written. In developing a particular write plan, nodepicker 130 may be configured to ensure that the write plan has a reasonable chance of succeeding—for example, that the nodes 160 specified in the write plan are in fact operational and are expected to have sufficient storage resources available to accept the object 30- and that the write plan, if completed, would satisfy all storage policies pertinent to write operations. Example write storage policies may include the following: Durability policy: If the write plan successfully completes, instances of object 30 will be stored on at least N different nodes 160. Area diversity policy: If possible, the write plan will include nodes 160 distributed among at least M different areas. Locality policy: If possible, the write plan will give preference (e.g., in number) to nodes 160 in an area local to the requesting coordinator 120. Load balancing policy: Attempt to equalize write request traffic among nodes 160 (e.g., to avoid "hot nodes"). Space balancing policy: Attempt to equalize the storage resource capacity utilization among nodes 160. Lowest-cost chain policy: Attempt to minimize the total cost (e.g., network latency) of the sequence of node write operations in the write plan.

It is noted that in various embodiments, nodepicker 130 may be configured to take some or all of these policies, or other policies not listed, into account when formulating a given write plan. Further, different policies may be weighted with different priorities. In some embodiments, multiple instances of nodepicker 130 may be deployed throughout the storage service system. For example, a respective instance of nodepicker 130 may be deployed for each instance of coordinator 120. While nodepicker 130 may be deployed as a service that may be accessed from coordinators 120 (and replicator 180) via an API, this configuration is not essential. In other embodiments, the functionality of nodepicker 130 may be incorporated directly within instances of coordinator 120 and/or replicator 180.

In one embodiment, replicator 180 may operate to examine objects 30 to determine whether the number of valid replicas of each object 30 satisfies a target number (e.g., whether the number of replicas is at least the target number at the time the determination is made). Specifically, in one embodiment, replicator 180 may be configured to continuously iterate over records specifying the number and location of instances of each object 30. For example, replicator 180 may reference the replicator keymap 190, which, like keymap instances 140 described in greater detail below, may be configured to store mappings between object keys and corresponding locators identifying replicated object instances. (In other embodiments, replicator 180 may consult one of keymap instances 140 rather than a dedicated instance of the keymap.) In some embodiments, it is contemplated that multiple instances of replicator 180 may be configured to concurrently examine different portions of the keymap space, which may reduce the overall amount of time required to examine the status of all objects 30 managed by the storage service system.

If replicator 180 determines that the target number of valid replicas is not satisfied for a given object 30, it may be configured to write additional replicas of the given object 30, in a manner similar to coordinator 120 performing a write operation to the given object 30.

As mentioned above, the overall reliability of storage of an object 30 may be increased by storing replicas of object data, for example within different areas or data centers. However, it is noted that in some embodiments, each replica need not correspond to an exact copy of the object data. In one embodiment, an object 30 may be divided into a number of portions or "shards" according to a redundant encoding scheme (such as a parity, error correction code or other scheme), such that the object data may be recreated from fewer than all of the generated portions. For example, using various schemes to generate N portions from an object 30, the object data may be recreated from any N−1 of the portions, any simple majority of the N portions, or other combinations of portions according to the encoding scheme. In such an embodiment, the replicas of object 30 may correspond to the generated portions, or certain combinations of the portions. Such an approach may provide effective fault tolerance while reducing data storage requirements in comparison to storing multiple complete copies of the object data. However, it is noted that in some embodiments, redundant encoding techniques may also be used in combination with complete replication of object data. For example, multiple individual complete copies of object data may be stored among nodes 160 as respective collections of multiple potions determined according to a suitable redundant encoding technique as mentioned above. It is noted that in some embodiments, certain objects 30 need not be stored with any degree of replication or fault tolerance at all. For example, as described below in conjunction with the description of storage classes, a client may request that an object 30 be stored according to a storage class that specifies little or no degree of fault tolerance, possibly at lower cost than for a storage class specifying a higher degree of fault tolerance.

Generally speaking, keymap instances 140 may provide records of the relationships between keys of objects 30 and locators of particular instances or replicas of objects 30. In storing such records, keymap instances 140 also reflect the degree to which objects 30 are replicated within the storage system (e.g., how many instances of an object 30 exist, and how they may be referenced). Bitstore nodes 160 may generally provide storage for individual instances of objects 30 as identified by locators. However, a given node 160 may be unaware of the state of an instance with respect to any other nodes 160, or of the relationship between an instance's locator and the key of its corresponding object 30. That is, generally speaking, the state information maintained by keymap instances 140 may be transparent to bitstore nodes 160. DFDD 110 may operate to detect and communicate state information regarding the operational status of nodes 160 and/or keymap instances 140 (and replicator keymap 190, if implemented), such that clients of DFDD 110 such as coordinators 120 and replicator 180 may obtain an accurate, though possibly delayed view of the detected status.

One embodiment illustrating a physical deployment of certain components of the storage service system architecture of FIG. 2 is shown in FIG. 3. In the illustrated embodiment, a data center 300 is shown including two areas 310a-b. Additionally, areas 310c-d are shown externally to data center 300, and areas 310a-d are interconnected via network 60. Each of areas 310a-d includes a respective coordinator instance 120a-d. Areas 310a-d may also include various combinations of bitstore nodes 160 and keymap instances 140, as well as other components of FIG. 2 not shown in FIG. 3. For example, area 310a includes four bitstore nodes 160, area 310b includes three bitstore nodes 160 and a keymap instance 140, area 310c includes two bitstore nodes 160, and area 310d includes one bitstore node 160 and one keymap instance 140.

Areas 310 may include additional levels of hierarchy (not shown). For example, in one embodiment areas 310 may be subdivided into racks, which may be further subdivided into individual nodes, such as bitstore nodes 160, although any suitable area organization may be employed. Generally speaking, areas 310 may include computing resources sufficient to implement the storage service system components deployed within the area. For example, each bitstore node 160 may be implemented as an autonomous computer system that may include a variety of hardware and software components as described elsewhere herein.

In some embodiments, components such as web services platform 100, coordinators 120, nodepicker 130, replicator 180, and DFDD 110 may be implemented via discrete computing resources within each area 310 in which the components are deployed. For example, each of these components may be implemented as a set of instructions and data executable by a respective computer system. Alternatively, some or all of these components may be implemented as processes that may execute concurrently on one or more computer systems. In some embodiments, computing resources used to implement some or all of these components may be shared with those resources used to implement bitstore nodes 160 or keymap instances 140. For example, a computer system may be configured to implement both some portion of keymap 140 functionality as well as coordinator 120 functionality. Generally speaking, any suitable partitioning of the components of FIG. 2 across computing resources deployed within individual areas 310 may be employed. It is noted that, as shown in FIG. 3, different areas 310 may include different combinations of storage service system components, and the embodiment shown is intended to be illustrative rather than limiting.

Additionally, different storage service system components may communicate according to any suitable type of communication protocol. For example, where certain components of FIG. 2 are implemented as discrete applications or executable processes, they may communicate with one another using standard interprocess communication techniques that may be provided by an operating system or platform (e.g., remote procedure calls, queues, mailboxes, sockets, etc.), or by using standard or proprietary platform-independent communication protocols. Such protocols may include stateful or stateless protocols that may support arbitrary levels of handshaking/acknowledgement, error detection and correction, or other communication features as may be required or desired for the communicating components. For example, in one storage service system embodiment, a substantial degree of inter-component communication may be implemented using a suitable Internet transport layer protocol, such as a version of Transmission Control Protocol (TCP), User Datagram Protocol (UDP) or a similar standard or proprietary transport protocol. However, it is also contemplated that communications among storage service system components may be implemented using protocols at higher layers of protocol abstraction. For example, like communications between clients 50 and web services interface 100, communications between storage service system components may be conducted using application layer protocols such as web services calls over HTTP, for example.

Figure 4:
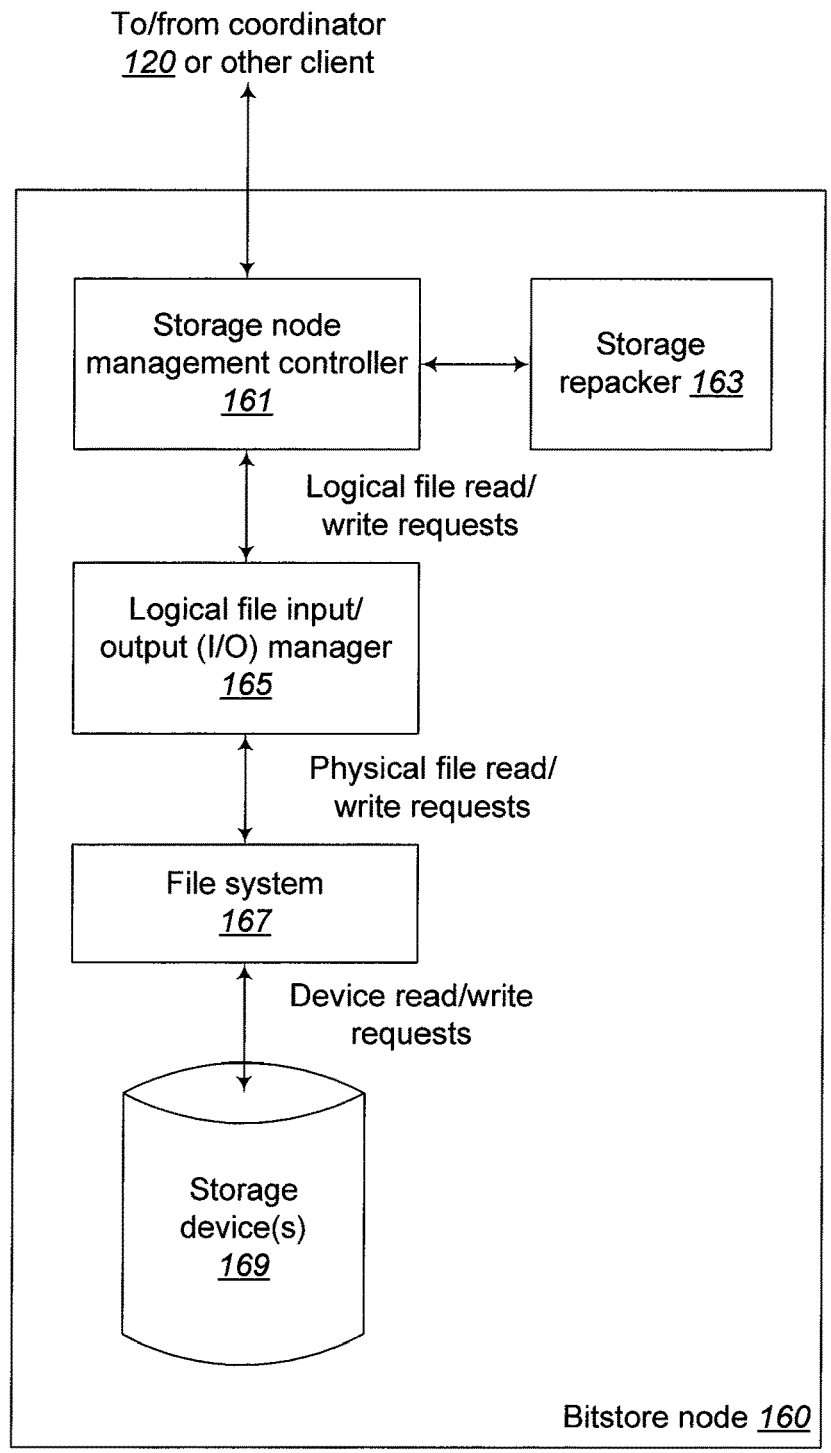
FIG. 4 is a block diagram illustrating one embodiment of a storage node.

As discussed above, in the storage service system architecture embodiment shown in FIG. 2, bitstore nodes 160 may generally operate to provide storage for the various objects 30 managed by the storage service system. One exemplary embodiment of a bitstore node 160 is shown in FIG. 4. In the illustrated embodiment, bitstore node 160 includes a storage node management (SNM) controller 161 configured to interface with a storage repacker 163 and a logical file input/output (I/O) manager 165. Manager 165 is configured to interface with a file system 167, which is in turn configured to manage one or more storage devices 169. In various embodiments, any of SNM controller 161, storage repacker 163, logical file I/O manager 165 or file system 167 may be implemented as instructions that may be stored on a computer-accessible medium and executable by a computer to perform the functions described herein. Alternatively, any of these components may be implemented by dedicated hardware circuits or devices.

In one embodiment, SNM controller 161 may be configured to provide an object storage API to a client of node 160 as well as to coordinate the activities of other components of node 160 to fulfill actions according to the API. For example, a controller 120 may be configured to store and retrieve objects 30 to and from a given node 160 via the API presented by SNM controller 161. While API management is described herein as a feature of SNM controller 161, it is contemplated that in some embodiments, the API processing functions of node 160 may be implemented in a module or component distinct from SNM controller 161.

The object storage API may support object put, get and release operations. In one such embodiment, an object put operation, which may also be generically referred to as a store operation or a write operation, may specify the data and/or metadata of an object 30 as an argument or parameter of the operation. Upon completion on a given node 160, a put operation may return to the requesting client a locator corresponding to the stored object 30, which may uniquely identify the object instance on the given node 160 relative to all other objects 30 stored throughout the storage service system.

Conversely, an object get operation, which may also be generically referred to as a read or retrieval operation, may specify a locator of an object 30 as a parameter. Upon completion, a get operation may return to the requesting client the object data and/or metadata corresponding to the specified locator. In some embodiments, the get operation may support a parameter that allows a requesting client to specify whether object data, metadata or both are to be returned to the client.

Like a get operation, an object release operation, which may also be generically referred to as a delete or remove operation, may specify a locator of an object 30 as a parameter. However, upon completion, a release operation may release storage resources previously associated with the referenced object 30, and such resources may then be used to store other objects 30. In one embodiment, once a locator is released, subsequent get operations to the locator may or may not succeed for a period of time. That is, a release operation may serve as a signal to node 160 that it may release storage resources for reuse, but node 160 may not attempt to do so immediately or to notify or otherwise synchronize such reuse with a client. Thus, continued attempts by a client to access an object 30 following its release may succeed for arbitrary periods of time, following which the object 30 may become inaccessible without notice. In other embodiments, node 160 may be configured to prevent client access to a locator that was previously released, regardless of whether the object data is still available.

It is contemplated that in various embodiments, put, get and release operations may employ other parameters and/or return various status, error or other indications according to any suitable protocol. For example, a put operation may return an error condition if there are insufficient resources on node 160 for the requested object 30 to be stored, or if the put cannot be completed for some other reason. It is also contemplated that in some embodiments, the object storage API of node 160 may include other operations. For example, the API may be configured to facilitate the creation of object replicas by supporting a replicate operation. In one embodiment, a replicate operation may operate similarly to a put operation, except that instead of supplying the data of the object 30 to be stored to a target node 160, a requesting client may specify a locator of that object 30 on a different node 160. The target node 160 may then interact with the specified node 160 to obtain the object data and/or metadata and may return to the client a locator of the object relative to the target node. In other embodiments, node 160 may support other suitable operations on objects 30.

It is noted that in some embodiments implementing put, get and release operations as described above, existing objects 30 may not be modified in place. Rather, an instance of an object 30 may be effectively modified by releasing the existing instance after writing a new instance that includes the modified data. Such an approach may simplify implementation of the underlying management layers of node 160, for example by reducing fragmentation or object relocation that may occur if a modification to an object 30 renders it smaller or larger than its original size. In some embodiments the storage service system may support splitting of large objects into chunks, each of which may be managed as a distinct object 30. This approach may improve the performance of node 160 in processing large objects that may be frequently modified by limiting the scope of the chunks that may need to be rewritten. However, it is contemplated that in other embodiments, node 160 may include those features necessary to support modification of objects 30 in place rather than through the release-rewrite approach just described.

In the illustrated embodiment, logical file I/O manager 165 (or, simply, manager 165) may be configured to virtualize underlying device or file system characteristics in order to present to SNM controller 161 and repacker 163 one or more logically contiguous storage spaces in which objects 30 may reside. For example, a given object 30 may be located within a logical storage space according to its offset within the storage space and its extent from that offset (e.g., in terms of the object size, including data and metadata). By providing such a logical storage space, manager 165 may present a uniform view of underlying storage to SNM controller 161 regardless of the implementation details of such underlying storage.

To facilitate access to objects 30 within the logical storage space, in one embodiment manager 165 may be configured to assign an object index value (also referred to as an object index) to each object 30 stored to a node 160. Generally speaking, the index of any given object 30 may be unique within a particular node 160. For example, in one embodiment the object index may be obtained by incrementing a counter whenever an object 30 is stored to a node 160, and using the resulting counter value as the object index. (In embodiments where multiple object write operations are allowed to proceed concurrently, the counter increment may be synchronized, e.g., through serialization, to ensure that object index values are assigned in a consistent and predictable fashion.) A sufficiently large counter value, such as a 64-bit unsigned integer, for example, may ensure that for practical purposes every object 30 is assigned a unique index value. Such a counter may roll over after, say, $2^{64}$ objects have been stored, after which previously-generated index values may repeat. However, collisions are extremely unlikely, as it is highly improbable that the object 30 that was previously assigned a given index value will still exist within node 160 after the counter rolls over. It is noted that any other suitable method for assigning an object index may also be employed. As described below, object index values may be used in combination with a unique identifier of a node 160 to determine a locator value that may be used by coordinator 120 or other clients of node 160 to reference a particular object 30.

Figure 5:
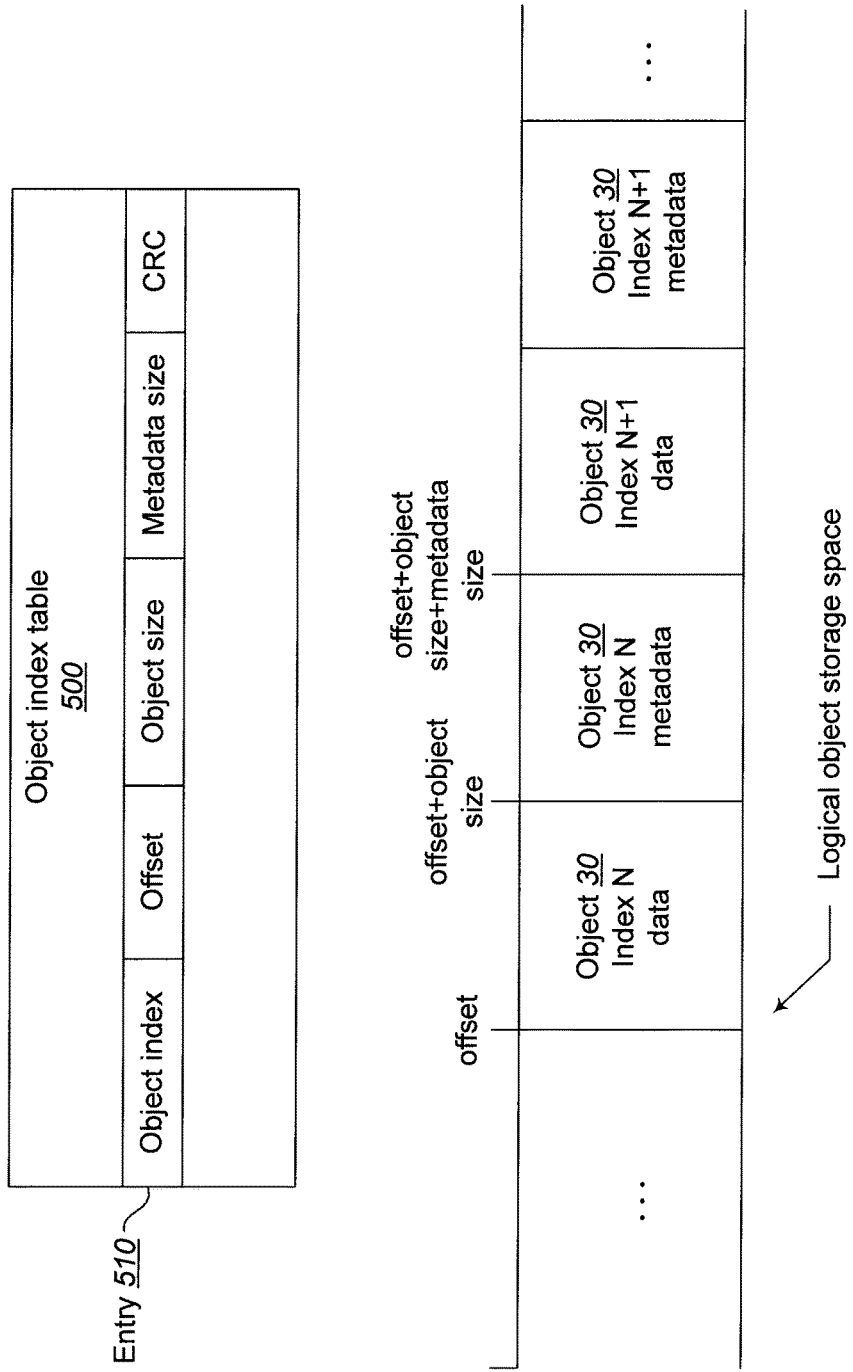
FIG. 5 is a block diagram illustrating one embodiment of data structures configured to organize data objects within a storage node.

Manager 165 may be configured to use the unique object index values described above to organize information about where objects 30 are located within the logical storage space in ways that facilitate object access. For example, as shown in the upper portion of FIG. 5, in one embodiment manager 165 may be configured to store a table or similar data structure that may be organized for ready access via object index values. In the illustrated embodiment, index table 500 may include a number of entries 510, each of which may include a number of fields including an object index field, an offset field, an object size field, a metadata size field, and a cyclic redundancy check (CRC) field. As shown in the lower portion of FIG. 5 for several exemplary objects 30, the offset field of an entry 510 may specify the location of the beginning of the corresponding object 30 within the logical storage space, and the object size and metadata size fields may specify the degree to which the object data and metadata extend from the offset point. In the illustrated embodiment, object data precedes object metadata, although this order may be reversed in other embodiments. The CRC field may store the result of a cyclic redundancy check algorithm or other suitable type of checksum or hash algorithm. The value initially stored into the CRC field may be computed when an object 30 is initially stored to node 160. Subsequently, when the object 30 is accessed, the same algorithm may be applied to the object data and or metadata and the resultant value compared against the stored CRC field value. If the comparison results in a mismatch, the integrity of the stored data may have been compromised. It is noted that in other embodiments, entries 510 may include additional or different fields from those shown. For example, the CRC field may be omitted or implemented elsewhere. Additionally, absolute locations of object data and metadata may be stored in addition to or instead of relative offsets.

Repacker 163 may be configured to operate on the logical object storage space to remove gaps that may appear when objects 30 are released and their associated storage resources are reclaimed. In one embodiment, repacker 163 may be configured to scan the logical object storage space (e.g., periodically or continuously) to identify objects 30 that have been marked by SNM controller 161 and/or manager 165 as having been released by a previous release operation. Repacker 163 may then cause the entries 510 of those objects 30 with indexes that appear after the index of the released object 30 to be updated to reflect the removal of the released object 30, which may effectively result in those objects 30 shifting towards the origin point of the logical object storage space. For example, if object N in the lower portion of FIG. 5 were to be released, repacker 163 may operate to cause the entry 510 corresponding to object N+1 to be updated to reflect the offset field of object N as the new offset field of object N+1. Repacker 163 may also cause the entry 510 associated with object N to be deleted, and may update the offsets of objects following object N+1 to reflect the shift. In one embodiment, manager 165 may cause corresponding shifts of object data and metadata to occur within the files or structures underlying the logical object storage space and/or storage devices 169. Thus, in some embodiments, the operation of repacker 163 may reduce fragmentation of underlying storage structures and may correspondingly improve the object access performance of node 160.

In some embodiments, manager 165 may be configured to execute on multiple different execution platforms including different types of hardware and software. In some such embodiments, one or more additional layers of abstraction may exist between the logical object storage space presented by manager 165 to SNM controller 161 and its clients. For example, in the illustrated embodiment, manager 165 may be configured to implement the logical object storage space as one or more physical files managed by file system 167. Generally speaking, file system 167 may be configured to organize various types of physical storage devices 169 into logical storage devices that may store data in logical units referred to herein as physical files. Logical storage devices managed by file system 167 may be hierarchical in nature. For example, file system 167 may support a hierarchy of directories or folders that may be navigated to store and access physical files. Generally speaking, file system 167 may be configured to track and manage the relationship between a given physical file and the locations of storage devices 169 where corresponding data and/or metadata of the physical file are stored. Thus, in one embodiment, manager 165 may manage the mapping of the logical object storage space to one or more physical files allocated by file system 167. In turn, file system 167 may manage the mapping of these physical files to addressable locations of storage devices 169.

File system 167 may generally be integrated within an operating system, although any given operating system may support a variety of different file systems 167 that offer different features for management of underlying devices 169. For example, various versions of the Microsoft Windows® operating system support file systems such as the NT file system (NTFS) as well as the FAT32 (File Allocation Table-32) and FAT16 file systems. Various versions of the Linux and Unix operating systems may support file systems such as the ext/ext2 file systems, the Network File System (NFS), the Reiser File System (ReiserFS), the Fast File System (FFS), and numerous others. Some third-party software vendors may offer proprietary file systems for integration with various computing platforms, such as the VERITAS® File System (VxFS), for example. Different file systems may offer support for various features for managing underlying storage devices 169. For example, some file systems 167 may offer support for implementing device mirroring, striping, snapshotting or other types of virtualization features.

It is noted that in some embodiments, still further layers of abstraction may exist between manager 165 and storage devices 169. For example, in some embodiments a volume manager layer may be provided between file system 167 and storage devices 169, and may be configured to perform some or all of the virtualization features mentioned above. Alternatively, a particular storage device 169 may be configured as a standalone array of hard disk drives or other devices that includes a virtualization controller. The virtualization controller may be configured to present the disk drives to file system 167 as a single physical device, although internally the virtualization controller may support arbitrarily complex mappings of the device's storage address space to the disk drives, similar to virtualization mappings that may be supported by a volume manager or within file system 167 as mentioned above. It is also noted that in some embodiments, fewer layers of abstraction than those shown may exist. For example, in some embodiments, manager 165 may be configured to interact directly with storage devices 169, e.g., as raw physical devices, without using a file system 167.

Generally speaking, storage devices 169 may include any suitable types of storage devices that may be supported by file system 167 and/or manager 165. Storage devices 169 may commonly include hard disk drive devices, such as Small Computer System Interface (SCSI) devices or AT Attachment Programming Interface (ATAPI) devices (which may also be known as Integrated Drive Electronics (IDE) devices). However, storage devices 169 may encompass any type of mass storage device including magnetic- or optical-medium-based devices, solid-state mass storage devices (e.g., nonvolatile- or "Flash"-memory-based devices), magnetic tape, etc. Further, storage devices 169 may be supported through any suitable interface type in addition to those mentioned above, such as interfaces compliant with a version of the Universal Serial Bus or IEEE 1394/Firewire® standards.

As described above, for any given instance of an object 30 stored within a storage service system, a corresponding locator may uniquely identify that instance across all of the nodes 160 within the system. In one embodiment, a locator may be generated as a concatenation, combination or other function of the object index value that may be assigned to an object instance by manager 165 as well as a unique identifier or "node ID" corresponding to the node 160 on which the object instance is stored. For example, as described above, a 64-bit object index value may be combined with a 64-bit node ID to yield a 128-bit locator. Such a locator would allow for each of as many as $2^{64}$ unique nodes 160 to store as many as $2^{64}$ unique object instances, although smaller or larger numbers of bits may be employed to form locators in various embodiments.

In one embodiment, a node ID may be formed through the concatenation or combination of a unique network address, such as an Internet Protocol (IP) address corresponding to a given node 160, with a timestamp or datestamp. For example, a node 160 may be assigned a node ID according to its IP address (e.g., at node startup/initialization or at the time the node ID is assigned, if not during initialization) in combination with a timestamp reflecting the time at which the IP address was assigned, or a time during which the IP address is known to be valid. Generally speaking, two distinct nodes 160 belonging to the same IP address space will not validly be assigned the same IP address at any given time. Thus, the combination of a node's IP address and a timestamp value may yield an identifier unique to that node. For example, a 32-bit IP address may be concatenated or combined with a 32-bit timestamp (e.g., that represents the number of seconds elapsed since some common reference time) to yield the 64-bit node ID referred to above, although other bit widths may be employed. It is also contemplated that other techniques may be employed for assigning unique node IDs that do not depend on node IP addresses. For example, a central authority such as a name server may delegate node IDs upon request in a fashion that guarantees the uniqueness of node IDs, similar to the assignment of object index values within a node 160 as described above.

It is noted that in embodiments where a node ID is derived from a node's IP address, the node ID may not reflect the current IP address of a node 160 at any given time. For example, the node ID may persist until a node 160 is reset, but the node's IP address may be changed or reassigned following generation of the node ID. Also, in some embodiments a node ID may be hashed, encrypted or obfuscated in a deterministic way in order to prevent storage clients 50 or other potentially malicious entities from decoding locators to determine actual node IP addresses.

Figures 6, 7:
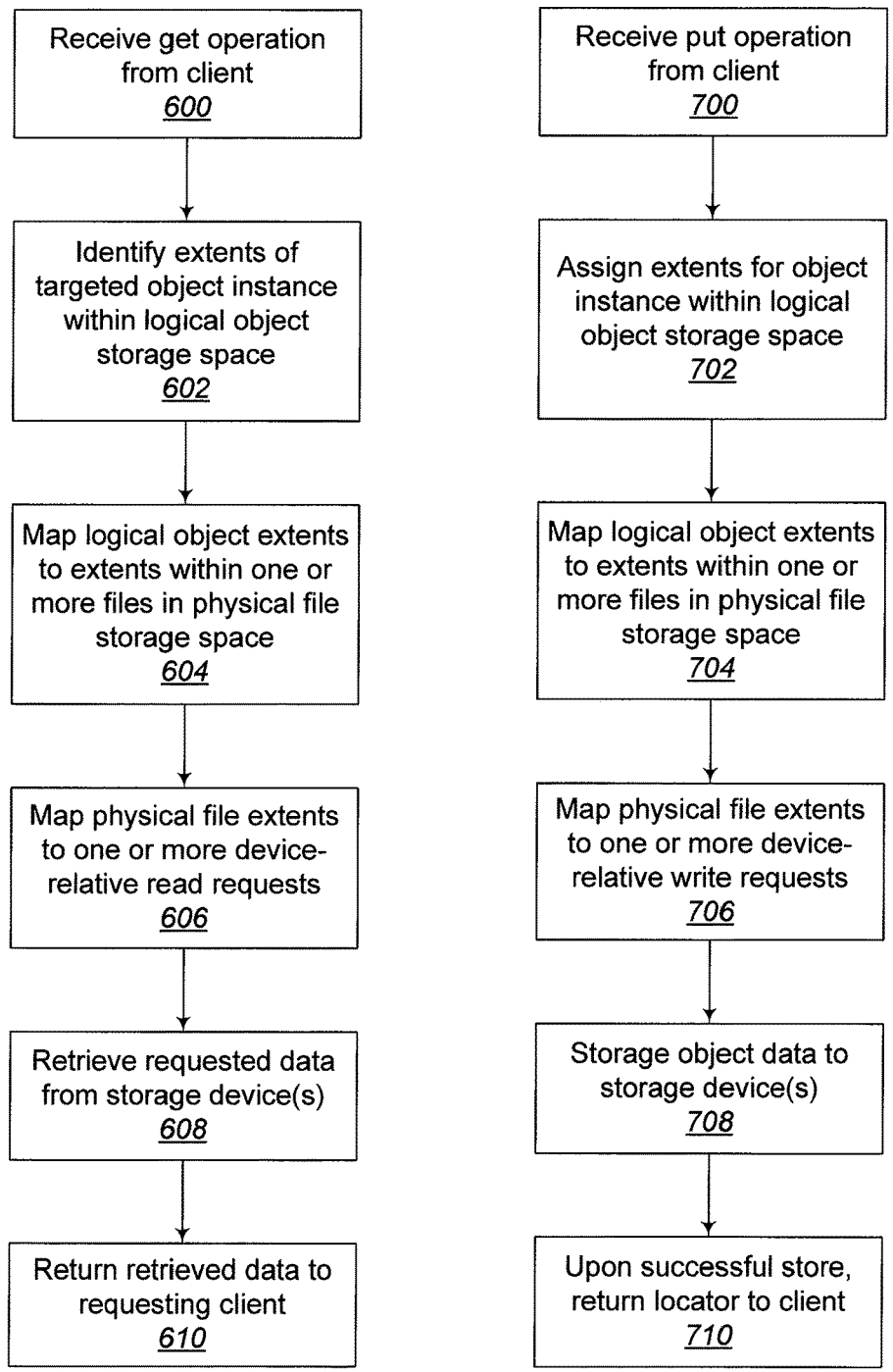
FIG. 6 is a flow diagram illustrating one embodiment of a method of performing an object get operation.
FIG. 7 is a flow diagram illustrating one embodiment of a method of performing an object put operation.
Figure 8:
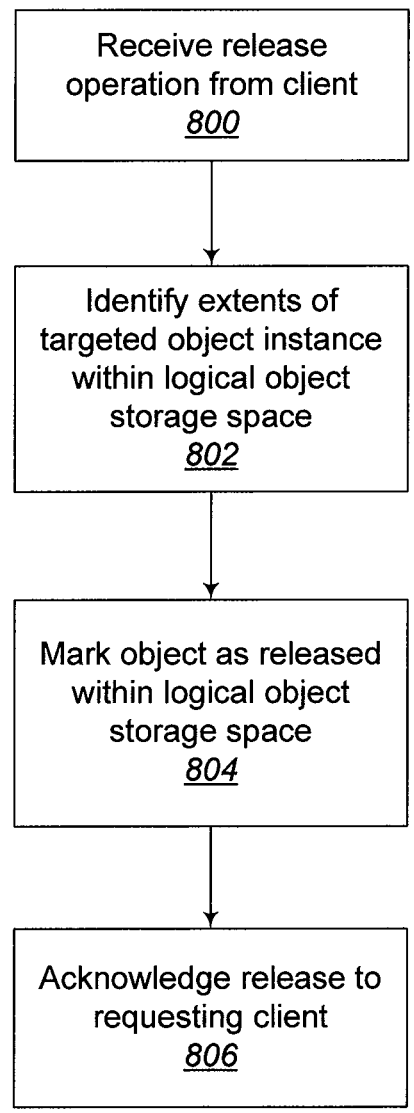
FIG. 8 is a flow diagram illustrating one embodiment of a method of performing an object release operation.

The operation of exemplary embodiments of get, put and release operations with respect to the embodiment of node 160 of FIG. 4 is illustrated in FIGS. 6-8. Referring first to FIG. 6, a get operation may begin in block 600 where the operation is received at node 160 from a coordinator 120 or other client. For example, a coordinator 120 may issue a get operation to a particular locator that includes a node ID and an object index value, as described above. The node ID may be used directly to route the get operation to the appropriate node 160, for example if the node ID reflects the current IP address of the target node 160. Alternatively, a directory service such as DFDD 110, described below, may be employed to resolve the node ID of a locator into an addressable endpoint or destination through which the get operation may be routed to the appropriate node 160.

Once received by node 160, the get operation may be processed to identify the extents of the targeted object instance within the logical object storage space of node 160 (block 602). For example, controller 161 may receive the get operation and convey it to manager 165. In turn, manager 165 may use the object index portion of the locator referenced by the get operation to access index table 500 in order to obtain the location of the desired object instance within the logical object storage space. For example, manager 165 may obtain the offset into the logical object storage space where the object instance begins, as well as the length of the object instance from that offset. In some embodiments, a get operation may specify whether object data, metadata, or both are desired. In such embodiments, manager 165 may determine the logical object storage extents relevant to the requested data. For example, if both object data and metadata are desired, manager 165 may use both the object data size and metadata size to determine the extent from the object offset to be retrieved. As noted above, in other embodiments, storage extents for object instances may be stored and managed by manager 165 in different ways, such as through absolute locations rather than relative offsets within the logical object storage space.

Object extents within the logical object storage space may then be mapped to extents within one or more corresponding files within a physical file storage space (block 604). For example, manager 165 may map the logical object storage space to one or more files managed by file system 167, and may issue appropriate file access operations to file system 167 to obtain data corresponding to the desired object extents, e.g., by referencing one or more file names as well as locations or offsets within the named files to be read. It is contemplated that in alternative embodiments, controller 161 may be configured to bypass the logical block storage space features managed by manager 165, and may instead interact directly with physical files managed by file system 167.

References to physical files may then be mapped to device-relative requests (block 606). For example, file system 167 may be configured to generate one or more read requests to specific addressable locations of storage device(s) 169, such as logical block addresses (LBAs) or addresses specific to device geometries (e.g., cylinder, track, sector and/or head). As noted above, in some embodiments manager 165 may be configured to bypass file system 167 and manage storage device(s) 169 directly.

Requested object data may then be retrieved from storage device(s) 169 (block 608) and returned to the requesting client (block 610). For example, retrieved data may be passed back up through the request hierarchy shown in FIG. 4, or may be returned directly from storage device(s) 169 or file system 167 to controller 161 for conveyance to the requesting client.

As shown in FIG. 7, in one embodiment, a put operation may begin in block 700 when the operation is received at node 160 from a coordinator 120 or other client, in a manner similar to that described above for block 600 of FIG. 6. For example, a coordinator 120 may issue put operations to nodes 160 specified in a write plan generated by nodepicker 130. In contrast to a get operation, a put operation may include the object data and/or metadata to be stored, and may optionally include additional parameters specifying the length of the data and/or metadata.

Once received by node 160, the put operation may be processed to assign storage extents for the object instance within the logical object storage space (block 702). In one embodiment, manager 165 may be configured to assign an object index value to the new object instance and to record in index table 500 a new entry 510 specifying the offset of the new object instance. For example, the offset of the new entry may be determined relative to the storage extents (e.g., offset and length) of the existing object instance having the highest index value. If the length of the data and/or metadata of the new object instance were not specified as parameters to the put operation, manager 165 or controller 161 may be configured to compute these for inclusion in the new entry 510.

Newly assigned storage extents within the logical object storage space may then be mapped to extents within one or more corresponding files within a physical file storage space (block 704). For example, the assigned extents for the new object instance may be appended to the end of one or more existing physical files, or otherwise located within existing or newly allocated physical files. Physical file extents may then be mapped to storage device extents (block 706), e.g., by file system 167 in a manner similar to that described above for get operations, and the object instance data and/or metadata may then be stored to storage device(s) 169 (block 708).

Upon confirmation that the data and/or metadata has been successfully written to storage device(s) 169, a locator corresponding to the stored object instance may be returned to the requesting client (block 710). For example, manager 165 may be configured to append the generated object index value to the node ID of node 160, and may return the resulting value as the object locator upon an indication from file system 167 that the physical file write operations successfully completed.

As shown in FIG. 8, in one embodiment a release operation may begin in block 800 when the operation is received at node 160 from a coordinator 120 or other client, in a manner similar to that described above for block 600 of FIG. 6. A release operation may simply specify the locator of the object instance to be released, although in other embodiments other arguments may also be supplied.

Like a get operation, once received by node 160, a release operation may be processed to identify the extents of the targeted object instance within the logical object storage space of node 160 (block 802). For example, controller 161 may receive the release operation and convey it to manager 165. In turn, manager 165 may use the object index portion of the locator referenced by the release operation to access index table 500 in order to identify the corresponding entry 510 of the referenced object instance. The referenced object may then be marked as released (block 804). For example, manager 165 may be configured to set the offset or another field of entry 510 to an illegal value, such as a negative number, which may signify that the entry is no longer valid. An acknowledgement may then be returned to the requesting client indicating that the object has been released (block 806).

As described above, various bitstore nodes 160 may be configured to provide storage for instances of an object 30. Nodes 160 may not provide any particular support for redundancy or data security individually; in fact, in some embodiments nodes 160 may be implemented using generic computing platforms running open-source operating systems (e.g., Linux) and providing storage via inexpensive, commodity hard drives (e.g., ATAPI/IDE hard drives). In such embodiments, individual systems may not be especially fault-tolerant. Rather, data security and redundancy may be provided through replication of objects 30 across a number of nodes 160, as described above.

Figure 9A:
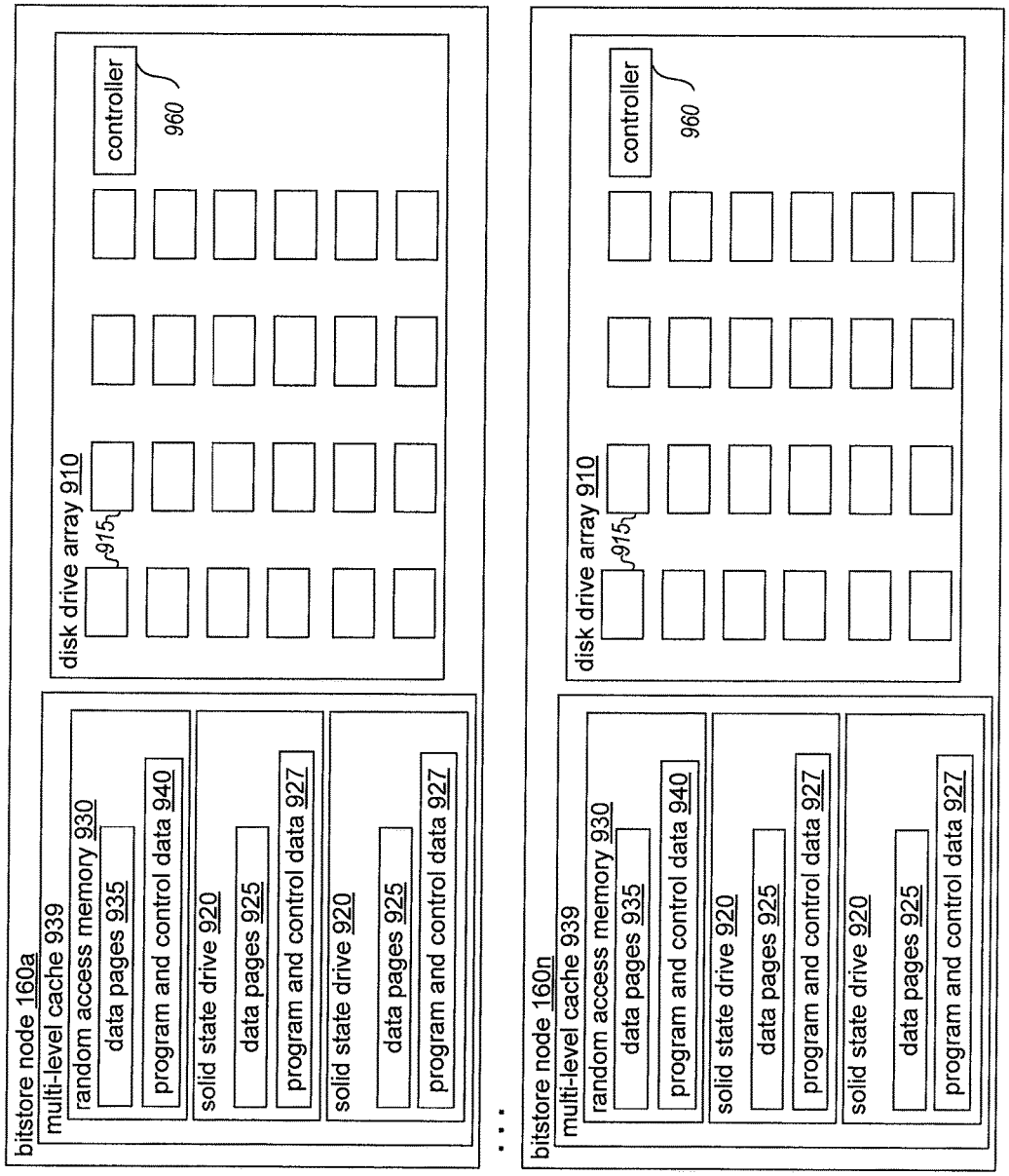
FIG. 9A illustrates an example of multiple bitstore nodes providing data storage functionality to clients.

FIG. 9A illustrates an example of multiple bitstore nodes 160 that may be used to provide storage for the various objects 30 managed by the storage service system. In this example, FIG. 9A illustrates a plurality of bitstore nodes 160 configured to store one or more objects (see objects 30 of FIG. 1) or portions thereof, such as in accordance with an erasure coding scheme (e.g., shards of an object). The example bitstore nodes 160 may, for example, correspond to a subset of bitstore nodes 160 of FIG. 2.

In this example, the bitstore nodes 160a-160n each comprise a disk-drive array 910, one or more solid state memory drives 920, a random access memory RAM 930 and a controller 960. Each disk drive array 910 includes a plurality of disk drives 915 (e.g., magnetic disk drives) configured to store data, such as a free-space table, hash, index and mapping information (e.g., basket pages), and actual data (e.g., user data, such as data pages of an object). For example, a disk drive array 910 of an embodiment may comprise 24 hard disk drives each configured to store between 3 and 5 terabytes of data. A disk drive array 910 may be configured to perform, for example, 10,000 specific data word operations per second, spread across the entire data set stored in the disk drive array. The solid state drives SSD 920 may comprise, for example, NAND flash drives, each configured to store, for example, 300 gigabytes of data, and to perform data operations on, for example, any 5000 words of data (e.g., 7 byte words) stored in the SSD per second. The SSD 920 as illustrated contains data pages 925 and program and control data 927 (e.g., free space data; data used to determine and/or implement cache management policies, such as data indicating whether data pages or objects stored in the RAM and/or the SSD are clean, dirty, etc., data indicating whether data pages or objects are prioritized, SSD flushing parameters such as SSD flushing frequencies and SSD delay thresholds, SSD eviction parameters such as SSD eviction frequencies and SSD delay thresholds, use prediction control parameters, etc., as discussed in more detail elsewhere; etc.). The RAM 930 as illustrated contains data pages 935 and program and control data 940 (e.g., free space data; data used to determine and/or implement cache management policies, such as data indicating whether data pages or objects stored in the RAM and/or the SSD are clean, dirty, etc., data indicating whether data pages or objects are prioritized, RAM flushing parameters such as RAM flushing frequencies and RAM delay thresholds, RAM eviction parameters such as RAM eviction frequencies, RAM delay thresholds, use prediction control parameters, etc., as discussed in more detail elsewhere; etc.). It is noted that data pages stored in the RAM typically would also be stored in one or more of the SSDs (e.g., an eviction policy for an SSD would typically not evict pages which have not been evicted from the RAM). The SSDs may be non-volatile. The controller 960 is configured to facilitate providing various functionality of the bitstore node, and may comprise, for example, a memory (not shown) and one or more processors (not shown) configured to execute instructions stored in the memory, an application specific integrated circuit, discrete circuitry, etc., and various combinations thereof. One or more racks may be employed in the bitstore nodes. For example, each bitstore node may be housed in a rack.

Thus, for example, if a storage client seeks to create or access data stored in the bitstore nodes 160, one or more storage service coordinators may be interacting with one or more bitstore nodes to create or access the stored data, such as via system software (not shown) that executes on the bitstore node(s) 160. As discussed in more detail elsewhere, when a storage client seeks to access a data page, the RAM 930 of the appropriate bitstore node(s) is checked, and if the data page is not stored in RAM, one or more SSDs of the appropriate bitstore node(s) are checked, and if the data page is not stored in an SSD, the data page is retrieved from the disk-drive array 910. When a data page is retrieved from the disk-drive array 910, it is stored in the SSD 920, and may typically be stored in the RAM 930 as well. Thus, the SSDs function as a data cache for the RAM 930, which itself functions as a data cache or buffer pool for the bitstore node (e.g., a cache or buffer pool for the most frequently used data pages). Together, the one or more SSDs 920 and the RAM 930 form a multi-level cache 939 of the bitstore node 160. This facilitates using a small amount of RAM in a buffer pool for an array of disks storing a large amount of data because the SSD(s) maintain the latency of the bitstore node at a lower level without increasing the size of the RAM. Instead, an overall size of the multi-level cache may be increased using relatively inexpensive SSD memory. Use of non-volatile SSD memory also allows data pages cached in the SSD to persist across system crashes or restarts.

Figure 9B:
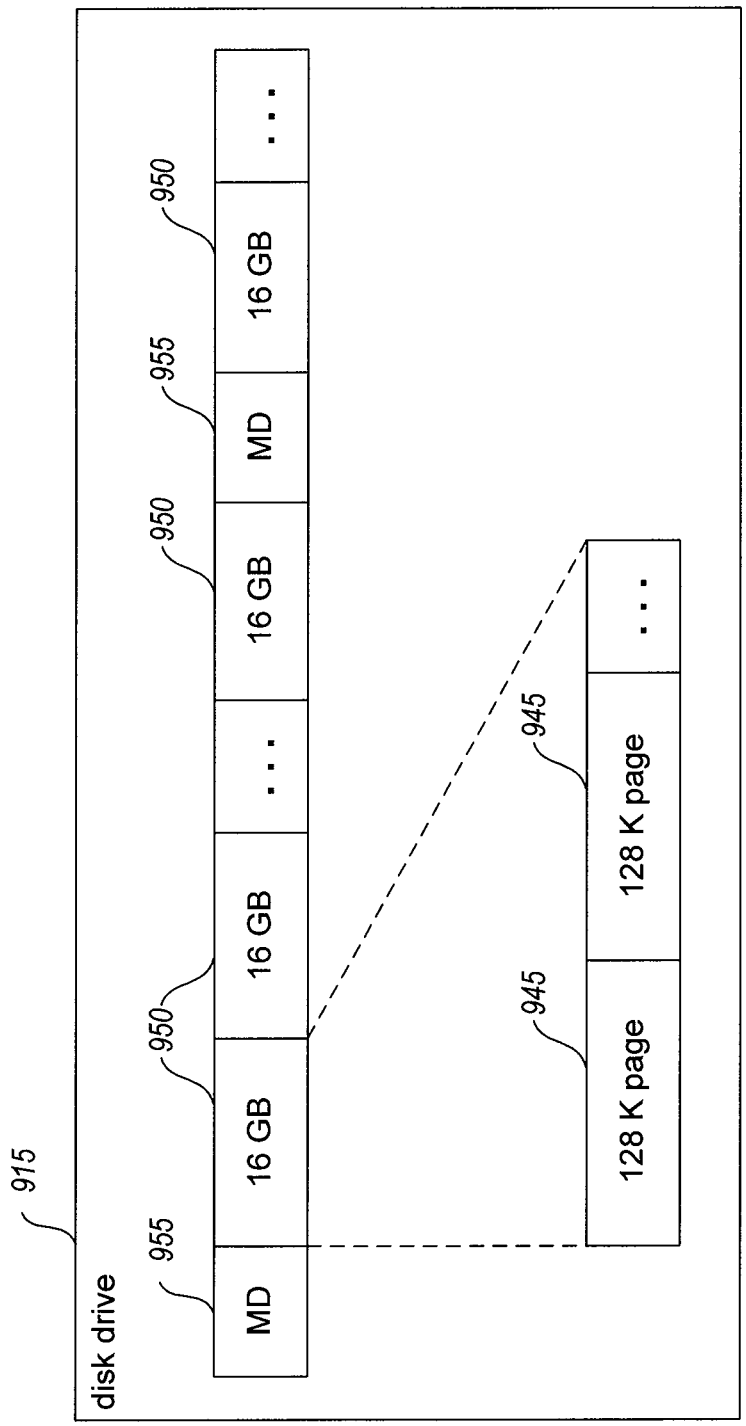
FIG. 9B illustrates an example of data page storage in a disk drive of a disk drive array of a data storage server.

FIG. 9B illustrates an example of storing data pages in a disk drive 915 of a disk-drive array (see disk drive array 910 of FIG. 9A). As illustrated, 128 k data pages 945 are stored in 16 GB data chunks 950. The data chunks 950 are grouped together in sets separated by metadata 955, such as metadata identifying the data pages of objects stored in the data chucks 950. In at least some embodiments, an entire 128 k data page may typically be retrieved for storage in an SSD and the RAM even if access to only a single byte is desired. For example, use of 128 k page sizes may facilitate input/output operations. Other pages sizes may be employed, and in some embodiments the RAM may only store a portion of a data page stored in an SSD. For example, in some embodiments the RAM may be configured to store pages having a page size of 8 k, while the SSD may be configured to store pages having a page size of 128 k.

It will be appreciated that the examples of FIGS. 9A and 9B have been simplified for the purposes of explanation, and that the number and organization of bitstore nodes, disk drive data storage configurations, and other devices may be much different than what is depicted. Similarly, in other embodiments, data may be stored and managed in other manners.

Figure 10:
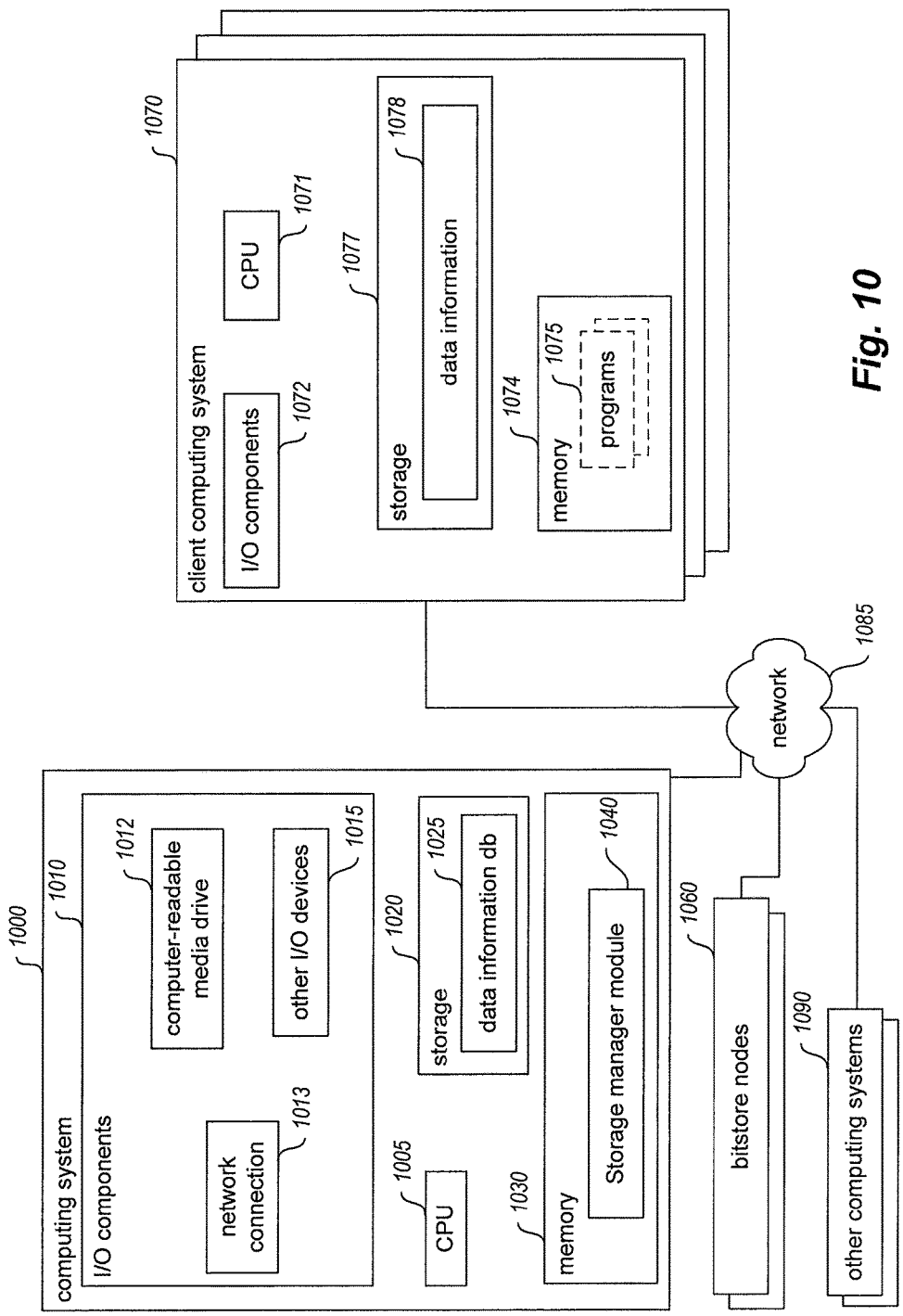
FIG. 10 is a block diagram illustrating example computing systems suitable for managing the provision to and use by clients of web service accessible data storage functionality.
Figure 11A:
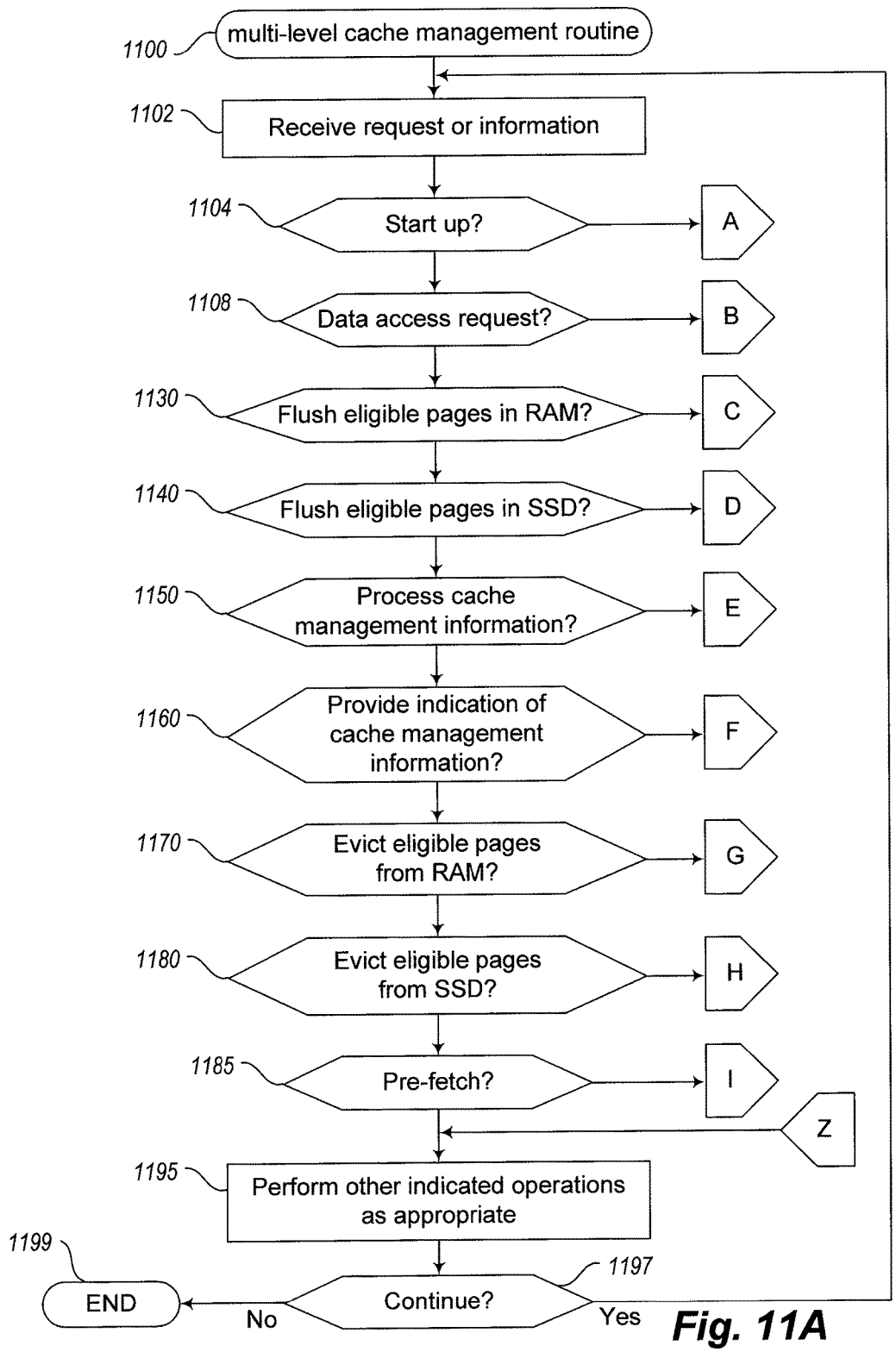
FIGS. 11A-11D illustrate a flow diagram of an example embodiment of a multi-level data cache management routine.
Figure 11B:
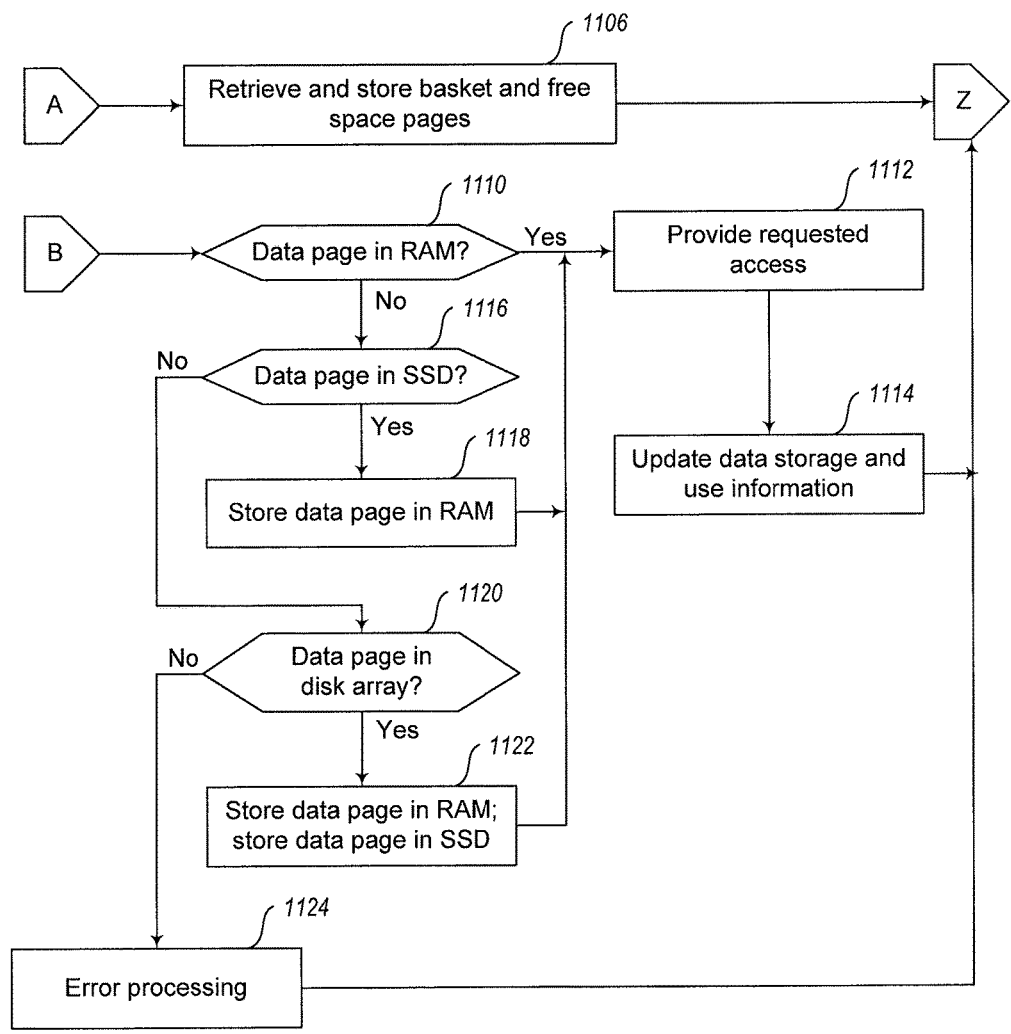
Figure 11C:
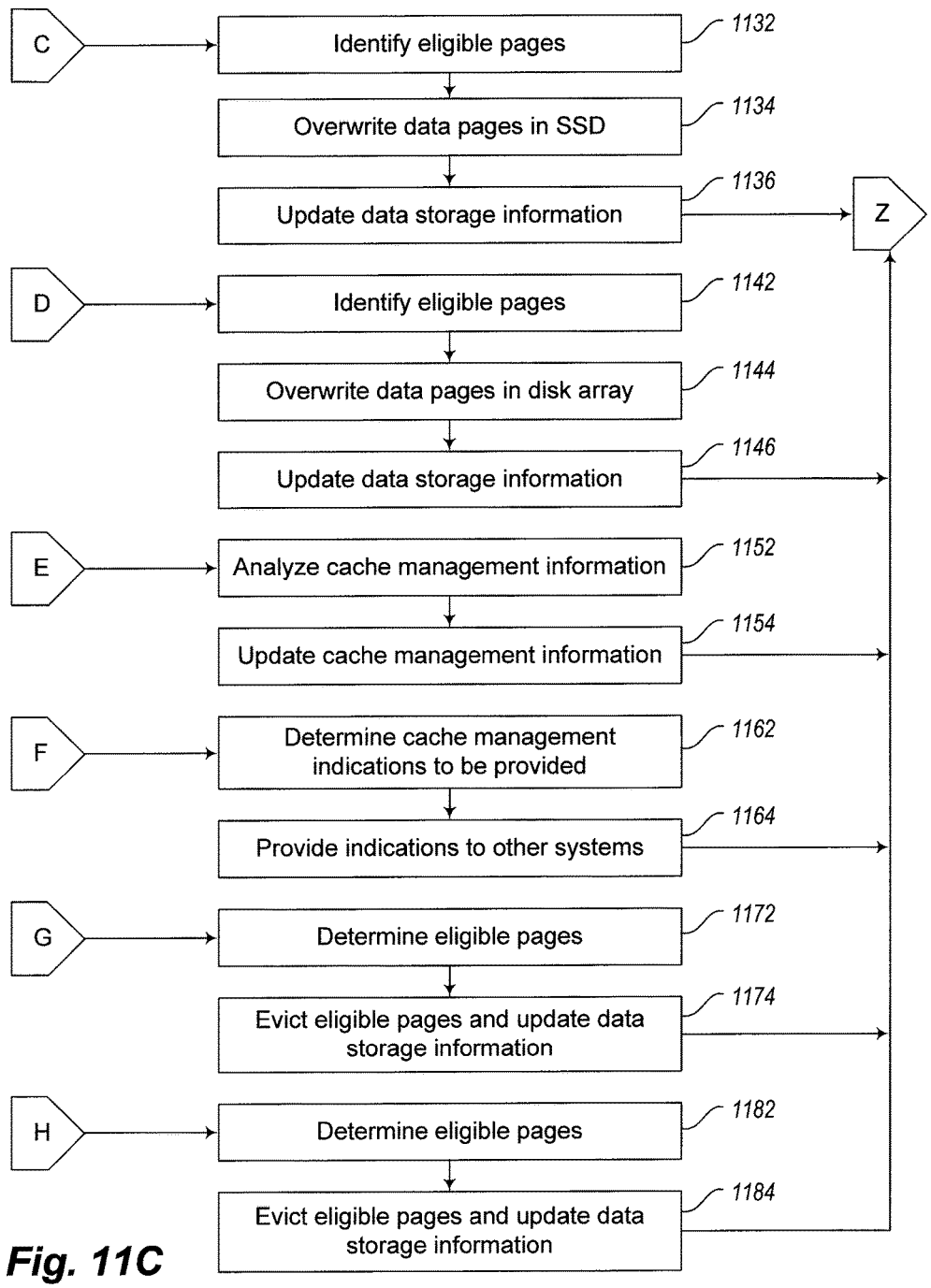
Figure 11D:
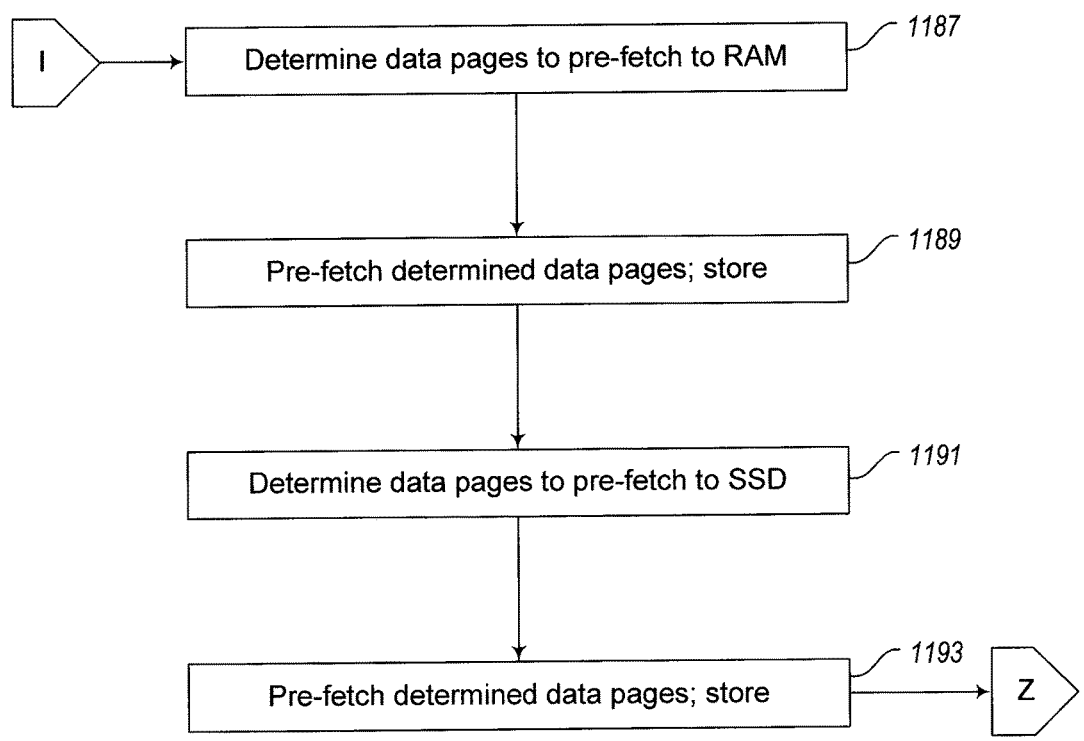

FIG. 10 is a block diagram illustrating example computing systems suitable for managing the provision and use of web service-accessible storage functionality to clients. In this example, a computing system 1000 executes an embodiment of a storage manager module 1040 to manage provision of web service-accessible storage functionality to client computing systems 1070 and/or on at least some other computing systems 1090, such as to data storage (not shown) provided by the bitstore nodes 1060.

In addition, multiple bitstore nodes 1060 are illustrated that each store at least some of the data (not shown), with access to the data also provided over the network 1085 in this example. One or more of the bitstore nodes 1060 may also each store a bitstore node software component (not shown) that manages operation of one or more of the bitstore nodes 1060, as well as various information (not shown) about the data that is stored by the bitstore nodes 1060. Thus, in at least some embodiments, the computing system 1000 of FIG. 10 may correspond to one or more of the storage service coordinators 120 of FIG. 2, and/or one or more of the bitstore nodes 1060 of FIG. 10 may correspond to bitstore nodes 160 of FIG. 2.

The other computing systems 1090 may further include other proximate or remote computing systems of various types in at least some embodiments, including computing systems via which clients or other users of the web service-accessible storage service interact with the computing systems 1000 and/or 1070.

In this example embodiment, computing system 1000 includes a CPU ("central processing unit") 1005, local storage 1020, memory 1030, and various I/O ("input/output") components 1010, with the illustrated I/O components in this example including a computer-readable media drive 1012, a network connection 1013, and other I/O devices 1015 (e.g., a keyboard, mouse, speakers, microphone, etc.). In the illustrated embodiment, the storage manager module 1040 is executing in memory 1030, and one or more other programs (not shown) may also optionally be executing in memory 1030.

Each computing system 1070 similarly includes a CPU 1071, local storage 1077, memory 1074, and various I/O components 1072 (e.g., I/O components similar to I/O components 1010 of server computing system 1000). In the illustrated embodiment, programs 1075 are executing in memory 1074 on the computing system, such as on behalf of customers of the web service-accessible storage service and/or data storage service. Similar to the server computing system 1000 and the client computing system 1070, the bitstore nodes 1060 and the other computing systems 1090 may contain additional components, such as a CPU, storage, memory and various I/O components, although such components are not shown in FIG. 10.

The storage manager module 1040 may take various actions to manage the provision and use of web service-accessible storage functionality to clients. In this example, the storage manager module 1040 may maintain a database 1025 on storage 1020 that includes information about data stored on the bitstore nodes 1060 (e.g., for use in managing the stored data), and may further store various other information (not shown) about clients or other aspects of the web service-accessible storage service. In other embodiments, information about stored data may be stored in other manners, such as in a distributed manner and/or by other computing systems.

It will be appreciated that computing systems 1000, 1060, 1070 and 1090 are merely illustrative and are not intended to limit the scope of the present disclosure. For example, computing systems 1000, 1060, 1070 and/or 1090 may be connected to other devices that are not illustrated, including through network 1085 and/or one or more other networks, such as the Internet or via the World Wide Web ("Web"). More generally, a computing node or other computing system or a bitstore node may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments, the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), discrete circuitry, etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

FIGS. 11A-11D are a flow diagram of an example embodiment of a multi-level cache management routine 1100 for a bitstore node. The routine may be provided by, for example, execution of a software component on a bitstore node, such as to manage the storage of data on one or more levels of a multi-level cache of the bitstore node (e.g., for bitstore nodes 160 of FIGS. 2-4 and/or FIG. 9A). In other embodiments, some or all of the functionality of the routine may be provided in other manners, such as by software executing on one or more other computing systems to manage one or more bitstore nodes.

The illustrated embodiment of the routine begins at block 1102, where a request or information is received. The routine continues to block 1104 to determine whether the bitstore node is starting up, such as in response to a power-up command or other received information. If so, the routine continues to block 1106 to retrieve basket pages (e.g., pages with hash and index information, etc.) and free-space pages (e.g., pages identifying free space on the disk drive array) from the disk drive array and stores the retrieved pages in an SSD as SSD pages and/or in RAM as RAM pages. For convenience, the routine of FIGS. 11A-11D is discussed with reference to an embodiment of a bitstore node having a single SSD. As discussed elsewhere, multiple SSDs may be employed in embodiments of a bitstore node.

If it is instead determined in block 1104 that the received request or information does not indicate a system start up, the routine continues instead to block 1108 to determine whether a data access request (e.g., a get, put, or release request directed to data) has been received for data of a data page, such as from a storage service coordinator associated with a storage client that initiated the data access request and/or from a replicator. If so, the routine continues to block 1110 to determine whether the data page containing the requested data is stored in the RAM as a RAM page, such as by checking program and control data stored in the RAM. If so, the routine continues to block 1112 to provide access to the requested data (e.g., to a client that initiated the access request), and then continues to block 1114 to update page and/or object storage and use information, for example, to indicate the page is stored in the RAM as a RAM page and/or the SSD as an SSD page or as part of an SSD page, to update a number of accesses to a page and/or to pages of an object within one or more threshold periods of time, to indicate whether the data pages in RAM and in the SSD are clean, dirty (e.g., if the access request was a request to modify a data page (e.g., as part of a put access request), to indicate the RAM page is dirty), free, etc.

If it is instead determined the data page containing the requested data is not in the RAM, the routine proceeds to block 1116 to determine whether the data page is stored in the SSD, such as by checking program and control data stored in the SSD or in the RAM. If so, the routine continues to block 1118 to store the data page containing the data to which access was requested in the RAM as a RAM page, and then continues to block 1112 to provide access to the requested data and to block 1114 to update page and/or object storage and use information. It is noted that the data pages sizes in RAM may be different from the data page sizes in the SSD (e.g., the RAM may use a RAM page size of, for example, 8 k bytes, while the SSD may use an SSD page size of, for example, 128 k bytes).

If it is instead determined the data page containing the requested data is not in the SSD, the routine proceeds to block 1120 to determine whether the data page is stored in the disk array, such as by checking program and control data stored in the SSD, the RAM or the disk array. If so, the routine continues to block 1122 to store the data page containing the data to which access was requested in the SSD as an SSD data page, and in the RAM as a RAM data page, and then continues to block 1112 to provide access to the requested data and to block 1114 to update page and/or object storage and use information. It is noted that, for example, storing the page in the SSD may comprise storing a 128 k page in the SSD, and storing the page in the RAM may comprise storing an 8 k page, which is part of the 128 k page stored in the SSD, in the RAM. For example, the disk array and the SSD may employ 128 k page sizes, while the RAM employs 8 k page sizes.

If it is instead determined the data page containing the requested data is not in the disk array or cannot be retrieved from the disk array, the routine proceeds to block 1124 where error processing may be performed (e.g., sending an indication to a coordinator that the requested data is not available). It is noted that in the case of a put access request, determining whether data is stored in the RAM, the SSD and/or the disk array may comprise determining whether a free data page is available (e.g., by checking the free space page) and if so allocating an available page.

If it is instead determined in block 1108 that a data access request has not been received, the routine continues to block 1130 to determine whether to flush eligible RAM data pages in RAM to the SSD, such as in accordance with one or more cache management policies (e.g., RAM flushing policies). In some embodiments, it may be determined to flush one or more pages in RAM to the SSD based on one or more RAM flushing parameters indicative of RAM flushing policies. In some embodiments, it may be determined to flush one or more RAM pages in RAM to the SSD due to receipt of information indicating a data access request has modified data of the one or more RAM data pages stored in RAM, for example, when it is desired to promptly or immediately flush RAM data pages in the RAM which have been modified to the SSD also storing the data pages (e.g., as an SSD data page or as part of an SSD data page). In some embodiments, it may be determined to periodically flush eligible RAM data pages stored in the RAM to the SSD based on RAM flushing parameters, such as in accordance with a RAM flushing frequency, which may be variable. When it is determined to flush eligible RAM data pages stored in the RAM to the SSD storing the data pages (e.g., as an SSD data page or as part of an SSD data page), the routine proceeds from block 1130 to block 1132 to identify the eligible pages to flush. In some embodiments, eligible pages to flush are RAM data pages stored in the RAM which are identified as dirty in the RAM (e.g., pages which have been modified since they were stored in the RAM or since they were last flushed from the RAM to the SSD storing the data page). A RAM data page stored in the RAM may be identified as dirty while the corresponding SSD data page as stored in the SSD may not be identified as dirty (e.g., if the RAM data page in RAM has not yet been flushed to SSD). In some embodiments, identifying the pages eligible for flushing may include determining whether a delay threshold period of time since the page was marked as dirty has been exceeded. The routine proceeds to block 1134 to overwrite the SSD data pages corresponding to the eligible RAM data pages with data from the RAM data pages stored in the RAM. The routine proceeds to block 1136 to update the data storage information to indicate the eligible data pages flushed from the RAM are clean (not dirty) in the RAM, and to indicate the SSD data pages overwritten in whole or in part in the SSD are dirty in the SSD.

If it is instead determined in block 1130 not to perform flushing of eligible RAM data pages stored in the RAM, the routine continues to block 1140 to determine whether to flush eligible SSD data pages stored in the SSD to the disk array, such as in accordance with one or more cache management policies (e.g., SSD flushing policies). In some embodiments, it may be determined to flush one or more pages in an SSD to the disk array based on one or more SSD flushing parameters indicative of SSD flushing policies. In some embodiments, it may be determined to flush one or more pages in an SSD to the disk array due to receipt of information that one or more RAM data pages corresponding to the SSD data page were flushed from the RAM to the SSD, for example, when it is desired to promptly or immediately flush data pages which have been modified to the disk array (e.g., when the RAM flushing parameters indicate RAM data pages should be flushed immediately or promptly after modification). In some embodiments, it may be determined to periodically flush eligible SSD data pages stored in the SSD to the disk array, such as in accordance with an SSD flushing frequency parameter. The frequency at which periodic flushes of the SSD occur may be adjustable. When periodic flushing is employed for both the RAM and the SSD, flushing of the RAM may occur at a different frequency than flushing of the SSD. For example, the RAM may be flushed more frequently than the SSD. Some embodiments may employ prompt flushing of the RAM whenever an indication is received that a RAM data page stored in the RAM is dirty, while employing periodic flushing of eligible SSD data pages stored in the SSD to the disk array. When it is determined to flush eligible data pages stored in an SSD to the disk array, the routine proceeds from block 1140 to block 1142 to identify the eligible SSD data pages to flush from the SSD to the disk array. In some embodiments, eligible pages to flush are SSD data pages stored in the SSD which are identified as dirty in the SSD (e.g., pages which have been overwritten with data from RAM data pages since they were stored in the SSD). In some embodiments when determining whether an SSD data page in the SSD is eligible to be flushed, delay thresholds may be employed (e.g., whether the period of time since an SSD data page in the SSD was overwritten has exceeded a threshold). The routine proceeds to block 1144 to overwrite the corresponding data pages stored in the disk array with the data from the eligible SSD data pages stored in the SSD. The routine proceeds to block 1146 to update the data storage information to indicate the SSD data pages flushed from the SSD to the disk array are clean (not dirty) in the SSD.

If it is instead determined in block 1140 not to perform flushing of eligible SSD data pages stored in the SSD, the routine continues to block 1150 to determine whether to process page/object cache management information, such as to set or modify cache management policies. For example, page/object cache management information may be processed to identify data pages stored in the RAM and/or the SSD or retrieved from the disk array for storage in the SSD and/or the RAM as prioritized, for example, to indicate that an eviction policy should be applied to data pages having a lower prioritization level before being applied to data pages having a higher prioritization level, to identify data pages for pre-fetching to the SSD and/or to the SSD and the RAM, etc. In some embodiments, it may be determined to process page/object cache management information in response to information generated in response to an access request (e.g., a determination that a data page or object is hot (e.g., the rate of access to the data page or data pages of an object exceeds one or more thresholds) or is likely to be accessed within a threshold period of time (e.g., if other pages of an object are hot), information received from or about another bitstore node (e.g., another bitstore node in a set of bitstore nodes including the bitstore node, such as a set of bitstore nodes used to store one or more objects in accordance with an erasure coding scheme) that a data page or object is hot or is likely to be accessed (e.g., information that a shard of an object stored on a set of bitstore nodes including the bitstore node is hot on a bitstore node of the set, such as an adjacent shard to a shard stored on the bitstore node), information from a storage service coordinator, etc. In some embodiments, it may be determined to periodically process page/object cache management information.

When it is determined to process cache management information, the routine proceeds from block 1150 to block 1152 to analyze information that may be used for cache management, such as to control policies for evicting data pages from the RAM and the SSD, to control policies for flushing the RAM and/or the SSD (e.g., modifying the frequency of flushing or generating an indication to flush, for example, in response to an indication an overall data access rate to the bitstore node is increasing, an indication of free space available in the RAM or the SSD is below a threshold, so that pages may be flushed in preparation for eviction, an indication that data pages in one or more objects are being serially accessed, and thus that previous pages from the object may not be likely to be accessed within a threshold period of time, other indications predictive of future accesses to pages and objects, etc), to control policies for pre-fetching data pages, etc. The information analyzed may include data page and object use and storage information generated by the bitstore node, and information received from other bitstore nodes, a coordinator 120, etc. The routine proceeds from block 1152 to block 1154 to update cache management control information based on the analysis, such as data page and object prioritization information (e.g., prioritization levels and expiration thresholds), page and object use information (e.g., to indicate a page or object is being used by other bitstore nodes), flushing and eviction parameters, such as flushing and eviction frequencies, flushing and eviction delay thresholds, etc. It is noted that a data page or an object may be prioritized even though the page or object is not stored in the multi-level cache, or even stored on the disk drive array. For example, a data page may be prioritized so that if it is subsequently stored in the SSD or the RAM, the stored page will be prioritized in the SSD and/or in the RAM. A page or object may have a different prioritization level in the RAM and the SSD, such as a low prioritization level in the SSD and no prioritization level in the RAM, etc.

When it is not determined at block 1150 to process cache management information, the routine proceeds to block 1160 to determine whether to provide one or more indications of cache management information to another system, such as another bitstore node, or a coordinator 120, etc. In some embodiments, it may be determined to provide one or more indications of cache management information to another system, for example, in response to an update of cache management information based on an analysis of cache management information by the bitstore node, such as an analysis performed in block 1152, in response to an error, such as in response to a determination in block 1120 that a data page cannot be retrieved from a disk, etc. In some embodiments, indications of cache management information may be periodically provided to other systems. When it is determined to provide one or more indications of cache management information to another system, the routine proceeds from block 1160 to block 1162 to determine the cache management information indications to be provided and the other systems to which the indications are to be provided, and to block 1164 to provide the determined indications to the determined systems. In some embodiments, it may be determined to provide indications of current use information for an object (e.g., page use information for an object) to other bitstore nodes in a set of bitstore nodes storing the object in accordance with an erasure coding storage scheme, or to a subset of such bitstore nodes (e.g. bitstore nodes storing logically adjacent strips of an object or selected to store logically adjacent shards of an object), for use by those bitstore nodes as cache management information (e.g., for use in determining whether to modify a prioritization level of a RAM data page, an SSD data page, pages of an object, etc.).

If it is instead determined in block 1160 not to provide indications of cache management information to other systems, the routine proceeds to block 1170 to determine whether to evict eligible RAM data pages from the RAM, such as in accordance with one or more cache management policies (e.g., RAM eviction policies). The routine may, for example, determine to evict eligible RAM data pages from the RAM periodically or in response to an indication that RAM data pages should be evicted from the RAM (e.g., an indication that the free space in the RAM has fallen below a threshold free-space level, an indication that the RAM is storing a threshold number of RAM data pages that are unlikely to be accessed within a threshold period of time, an indication that the bitstore node is likely to experience a high level of access requests within a threshold period of time, an indication that the bitstore node is preparing to shutdown or is about to experience or is experiencing a failure, etc.). When it is determined to evict eligible RAM data pages from the RAM, the routine proceeds to block 1172 to determine eligible RAM data pages to evict from the RAM. Typically, only clean RAM data pages will be eligible for eviction from the RAM. Other factors that may be considered in some embodiments include the length of time since a RAM data page was accessed (e.g., a least recently used eviction algorithm), current RAM prioritization level of RAM data pages considered for eviction, the amount of free space in the RAM, etc. For example, when the free space is below a first threshold RAM free-space level and above a second threshold RAM free-space level, RAM data pages identified as clean and having a current RAM prioritization level above a first RAM threshold prioritization level may not be eligible for eviction, while RAM data pages identified as clean and having a current RAM prioritization level below the first RAM threshold prioritization level may be eligible for eviction. The routine proceeds from block 1172 to block 1174, to evict the eligible RAM data pages from the RAM and to update data storage information, such as to remove an indication that the data page is stored in the RAM as a RAM data page and to update free space information.

If it is instead determined in block 1170 not to evict eligible RAM data pages from the RAM, the routine proceeds to block 1180 to determine whether to evict eligible SSD data pages from the SSD, such as in accordance with one or more cache management policies (e.g., SSD eviction policies). The routine may, for example, determine to evict eligible SSD data pages from the SSD periodically or in response to an indication that SSD data pages should be evicted from the SSD (e.g., an indication that the free space in the SSD has fallen below a threshold free-space level, an indication that the SSD is storing a threshold number of SSD data pages that are unlikely to be accessed within a threshold period of time, an indication that the bitstore node is likely to experience a high level of access requests within a threshold period of time, an indication that the bitstore node is preparing to shutdown or is about to experience or is experiencing a failure, or etc.). When it is determined to evict eligible SSD data pages from the SSD, the routine proceeds to block 1182 to determine eligible SSD data pages to evict from the SSD. Typically, only a clean SSD data page no part of which is currently stored in the RAM as a RAM data page will be eligible for eviction from the SSD (e.g., if the RAM data page size is different from the SSD data page size, all corresponding RAM data pages previously stored in the RAM have been evicted from the RAM). Other factors that may be considered in some embodiments include the length of time since an SSD data page was accessed (e.g., a least recently used eviction algorithm), current SSD and/or RAM prioritization levels of SSD data pages considered for eviction (as previously noted, a data page may have a prioritization level even when the data page is not current stored (e.g., an SSD data page may have a RAM prioritization level even though no part of the SSD data page is currently stored in the RAM as a RAM data page, etc.)), the amount of free space in the RAM, the amount of free-space in the SSD, etc. For example, when the SSD free space is below a first threshold SSD free-space level and above a second threshold SSD free-space level, SSD data pages identified as clean and having a current SSD prioritization level above a first SSD threshold prioritization level may not be eligible for eviction, while SSD data pages identified as clean and having a current SSD prioritization level below the first SSD threshold prioritization level may be eligible for eviction. The routine proceeds from block 1182 to block 1184, to evict the eligible SSD data pages from the SSD and to update data storage information, such as to remove an indication that the data page is stored in the SSD as an SSD data page.

If it is instead determined in block 1180 to not evict eligible SSD data pages from the SSD, the routine proceeds to block 1185 to determine whether to perform pre-fetching of data pages. In some embodiments, the routine may determine to perform pre-fetching of data pages periodically, or in response to an indication that access to a set of data pages stored in the disk array is likely to be requested within a threshold period of time. Other factors that may be considered in some embodiments include an amount of free space in the RAM, an amount of free space in the SSD, actual or expected activity levels related to other access requests, etc. When it is determined to perform pre-fetching of data pages, the routine proceeds from block 1185 to block 1187 to determine data pages to pre-fetch to RAM and SSD, such as data pages identified in an analysis of data use information as likely to be accessed within a threshold period of time (e.g., in response to an indication generated by an analysis conducted in block 1152). The routine proceeds from block 1187 to block 1189 to pre-fetch the determined data pages from the disk array (if necessary) and store the data pages in RAM as RAM data pages and the corresponding SSD data pages in SSD as an SSD data pages (if necessary). The routine proceeds from block 1189 to block 1191 to determine data pages to pre-fetch to SSD without pre-fetching to RAM, such as data pages identified in an analysis of data use information as likely to be accessed within a threshold period of time (e.g., in response to an indication generated by an analysis conducted in block 1152). The routine proceeds from block 1191 to block 1193 to pre-fetch the determined data pages and store the data pages in SSD as SSD data pages.

If it is instead determined in block 1185 not to pre-fetch data pages, the routine continues to block 1195 to perform one or more other indicated operations as appropriate. Such other operations may have various forms in various embodiments, such as one or more of the following non-exclusive list: to provide information about use of objects (e.g., for metering of object use, such as for fee-based object use by customers); to perform ongoing maintenance or diagnostics for the bitstore node (e.g., to defragment local hard disks); etc. After blocks 1106, 1114, 1124, 1136, 1146, 1154, 1164, 1174, 1184, and 1193, the routine continues to block 1197 to determine whether to continue, such as until an explicit termination instruction is received. If so, the routine returns to block 1105, and if not continues to block 1199 and ends.

In addition, for at least some types of requests, the routine may in some embodiments further verify that the requester is authorized to make the request, such as based on access rights specified for the requester and/or an associated target of the request (e.g., an indicated object), while in other embodiments the routine may assume that requests have been previously authorized by a routine from which it receives requests (e.g., a coordinator or replicator). Furthermore, some or all types of actions taken on behalf of clients may be monitored and metered, such as for later use in determining corresponding usage-based fees for at least some of those actions.

In addition, as previously noted, in at least some embodiments and situations, objects may be migrated or otherwise moved from one bitstore node or set of bitstore nodes to another bitstore node or set of bitstore nodes. Various techniques may be used to move objects, and such movement may be initiated in various manners. In some situations, the movement may reflect problems related to one or more of the bitstore nodes on which the objects are stored (e.g., failure of the bitstore node(s) and/or of network access to the bitstore node(s)). In other situations, the movement may be performed to accommodate other objects to be stored on existing bitstore nodes, such as for higher-priority objects, or to consolidate the storage of related objects on a limited number of bitstore nodes, to enable the original bitstore node(s) that store the objects to be shut down for reasons such as maintenance, energy conservation, etc. As one specific example, if the one or more objects stored on a set of bitstore nodes need more resources than are available from that set of bitstore nodes, one or more of the objects may be migrated to one or more other bitstore nodes with additional resources. Overuse of available resources may occur for various reasons, such as one or more bitstore nodes having less resources than expected, one or more of the bitstore nodes using more resources than expected (or allowed), or, in embodiments in which available resources of one or more bitstore nodes are intentionally over-committed relative to possible resources needs of one or more reserved or stored objects. As discussed elsewhere herein, in some situations an object may be stored as a new object in response to a modification of the object, and the previously stored instances of the object released.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered or a different amount of functionality is desired. For example, in some embodiments it may be desired to not pre-fetch any data pages, in which case functionality related to pre-fetching may not be provided. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the disclosure. Accordingly, the disclosure is not limited except as by the appended claims and the elements recited therein. In addition, while certain aspects of the disclosure are presented below in certain claim forms, the inventors contemplate the various aspects in any available claim form. For example, while only some aspects of the invention may currently be recited as being embodied in a computer-readable medium, other aspects may likewise be so embodied.

What is claimed is:

1. A computer-implemented method, comprising:
    storing data in a first bitstore node, the first bitstore node including:
        a disk array having a plurality of disk drives configured to store data pages; and
        a multi-level cache communicatively coupled to the disk array and having a random access memory (RAM) configured to store RAM data pages and a solid-state memory drive (SSD) configured to store SSD data pages; and
    managing, by one or more programmed computing systems, the multi-level cache of the first bitstore node in accordance with one or more cache management policies, the managing of the multi-level cache including:
        receiving an indication from a distinct second bitstore node identifying one or more data pages associated with one or more of a group that includes an actual high level of use and an expected high level of use, wherein the first bitstore node and the distinct second bitstore node are part of a larger plurality of bitstore nodes associated with a web accessible data storage service;
        determining, based at least in part on the received indication from the distinct second bitstore node, to take one or more actions with respect to at least one data page of the first bitstore node that is related to the identified one or more data pages of the distinct second bitstore node;
        receiving one or more communications from other bitstore nodes in the larger plurality indicating data page accesses; and
        selectively pre-fetching data pages from the disk array of the first bitstore node based at least in part on the one or more communications received from the other bitstore nodes.

2. The computer-implemented method of claim 1 wherein the storing of the data in the first bitstore node includes storing object data on behalf of one or more clients of the web accessible data storage service, and wherein the one or more programmed computing systems are computing systems that implement functionality of the web accessible data storage service.

3. The computer-implemented method of claim 1, wherein the determining to take the one or more actions includes determining to delay or prevent a flush or eviction scheduled in accordance with the one or more cache management policies.

4. The computer-implemented method of claim 1 wherein the managing of the multi-level cache further includes:
    selectively assigning RAM prioritization levels to RAM data pages of the first bitstore node based at least in part on the received one or more communications from the other bitstore nodes; and
    selectively evicting data pages from the RAM of the first bitstore node based at least in part on the selective assigning of RAM prioritization levels to RAM data pages of the first bitstore node.

5. The computer-implemented method of claim 1 wherein the managing of the multi-level caches further includes:
    selectively flushing RAM data pages from the RAM to the SSD in accordance with one or more RAM flushing policies;
    selectively flushing SSD data pages from the SSD to the disk array in accordance with one or more SSD flushing policies;
    selectively evicting RAM data pages from the RAM in accordance with one or more RAM eviction policies; and
    selectively evicting SSD data pages from the SSD in accordance with one or more SSD eviction policies.

6. The computer-implemented method of claim 1 wherein a page size of the SSD is different from a page size of the RAM.

7. The method of claim 1 wherein the web accessible data storage service stores data objects within the larger plurality of bitstore nodes in accordance with an erasure coding scheme.

8. The method of claim 7 further comprising generating, by the one or more programmed computing systems, an indication of an access to a shard of an erasure coded object in the first bitstore node and prioritizing at least one other shard of the erasure coded object in at least one other bitstore node of the plurality of bitstore nodes based on the generated indication.

9. A non-transitory computer-readable medium having stored contents that cause a computing system to perform a method, the method comprising:
   storing data in a first bitstore node, the first bitstore node including:
      a disk array having a plurality of disk drives configured to store data pages; and
      a multi-level cache communicatively coupled to the disk array and having a random access memory (RAM) configured to store RAM data pages and a solid-state memory drive (SSD) configured to store SSD data pages; and
   managing the multi-level cache of the first bitstore node in accordance with one or more cache management policies, the managing of the multi-level cache including:
      receiving an indication from a distinct second bitstore node identifying one or more data pages associated with an actual high level of use or with an expected high level of use, wherein the first bitstore node and the distinct second bitstore node are part of a plurality of bitstore nodes of a web accessible data storage service providing access to data stored in the plurality of bitstore nodes;
      determining, based at least in part on the received indication from the distinct second bitstore node, to take one or more actions with respect to at least one data page of the first bitstore node that is related to the identified one or more data pages of the distinct second bitstore node;
      receiving one or more communications from other bitstore nodes in the plurality of bitstore nodes, each of the one or more communications indicating one or more data page accesses on one of the other bitstore nodes; and
      selectively pre-fetching data pages from the disk array of the first bitstore node based at least in part on the one or more communications received from the other bitstore nodes.

10. The non-transitory computer-readable medium of claim 9 wherein determining to take one or more actions with respect to the at least one data page includes determining to delay or prevent a flush or eviction of the at least one data page.

11. The non-transitory computer-readable medium of claim 9 wherein the managing of the multi-level cache comprises:
   selectively assigning RAM prioritization levels to data pages of the first bitstore node; and
   selectively evicting data pages from the RAM of the first bitstore node based at least in part on the selective assigning of RAM prioritization levels to data pages of the first bitstore node.

12. The non-transitory computer-readable medium of claim 9 wherein the managing the multi-level caches comprises:
   selectively flushing RAM data pages from the RAM of the first bitstore node to the SSD of the first bitstore node based on one or more RAM flushing parameters;
   selectively flushing SSD data pages from the SSD of the first bitstore node to the disk array of the first bitstore node based on one or more SSD flushing parameters;
   selectively evicting RAM data pages from the RAM of the first bitstore node based on one or more RAM eviction parameters; and
   selectively evicting SSD data pages from the SSD of the first bitstore node based on one or more SSD eviction parameters.

13. The non-transitory computer-readable medium of claim 9 wherein a page size of the SSD of the first bitstore node is different from a page size of the RAM of the first bitstore node.

14. The non-transitory computer-readable medium of claim 9 wherein the computer-readable medium is a memory of the computing system, and wherein the stored contents are instructions that, when executed, cause the computing system to perform the method.

15. A storage system, comprising:
   a plurality of bitstore nodes, each bitstore node including:
      a disk array having a plurality of disk drives;
      a multi-level cache that is communicatively coupled to the disk array and that includes a random access memory (RAM) configured to store RAM data pages and a solid-state memory drive (SSD) configured to store SSD data pages; and
      one or more processing devices configured to manage flushing and eviction of pages of the multi-level cache in accordance with one or more flushing and eviction policies; and
   wherein, in operation, the one or more configured processing devices of one of the bitstore nodes:
      receives an indication from a distinct other of the bitstore nodes identifying one or more data pages associated with one or more of a group that includes an actual high level of use and an expected high level of use; and
      responsive to the received indication from the distinct other bitstore node, determines to delay an eviction of one or more data pages local to the one bitstore node that are related to the identified one or more data pages of the distinct other bitstore node.

16. The storage system of claim 15 wherein the storage service system is configured to provide web accessible data storage.

17. The storage system of claim 16, further comprising:
   a controller of the one bitstore node configured to manage the multi-level cache of the first bitstore node; and
   a controller of the distinct other bitstore node configured to manage the multi-level cache of the distinct other bitstore node.

18. The storage system of claim 15 wherein the SSD and the disk array of the one bitstore node have a first page size and the RAM of the one bitstore node has a second page size different from the first page size.

19. The storage system of claim 15 wherein, for at least the one bitstore node of the plurality of bitstore nodes, the one or more configured processing devices are configured to manage flushing and eviction of pages of the multi-level cache by,
   selectively flushing RAM data pages from the RAM to the SSD based on one or more RAM flushing parameters;
   selectively flushing SSD data pages from the SSD to the disk array node based on one or more SSD flushing parameters;
   selectively evicting RAM data pages from the RAM based on one or more RAM eviction parameters; and selectively evicting SSD data pages from the SSD based on one or more SSD eviction parameters.

* * * * *